(12) United States Patent
Maruyama

(10) Patent No.: US 6,470,753 B2
(45) Date of Patent: Oct. 29, 2002

(54) VIBRATION MEASURING APPARATUS AND METHOD

(75) Inventor: Tetsuro Maruyama, Shizuoka (JP)

(73) Assignee: Suzuki Motor Company, Shizuoka (JP)

( * ) Notice: Subject to any disclaimer, the term of this patent is extended or adjusted under 35 U.S.C. 154(b) by 31 days.

(21) Appl. No.: 09/799,617

(22) Filed: Mar. 7, 2001

(65) Prior Publication Data

US 2001/0032514 A1 Oct. 25, 2001

(30) Foreign Application Priority Data

Mar. 13, 2000 (JP) .................................... 2000-069088

(51) Int. Cl.[7] ............................................... G01B 9/02
(52) U.S. Cl. ............................................................ 73/657
(58) Field of Search .......................... 73/649, 655, 657, 73/659

(56) References Cited

U.S. PATENT DOCUMENTS

| | | |
|---|---|---|
| 3,958,881 A | 5/1976 | Keene et al. |
| 5,680,212 A | 10/1997 | Blouin et al. |
| 5,827,971 A | 10/1998 | Hale et al. |

FOREIGN PATENT DOCUMENTS

| | | |
|---|---|---|
| DE | 4006690 | 9/1991 |
| DE | 19707773 | 8/1998 |
| JP | 11287699 | 10/1999 |

OTHER PUBLICATIONS

English Language Abstract of DE 40 06 690 C2.
English Language Abstract of DE 197 07 773 C2.
Shinohara et al., "Laser Doppler Velocimeter Using the Self–Mixing Effect of a Semiconductor Laser Diode", Applied Optics, May 1986, vol. 25 (9), pp. 1417–1419.
Shinohara et al., "Approximate Theory and Characteristics of Laser Doppler Velocimeter Using Self–Mixing Effect of Semiconductor Laser Diode", Electronics and Communications In Japan, Part 2, 1989, vol. 72, pp. 444–452.
Shibata et al., "Automatic Measurement of Velocity and Length of Moving Plate Using Self–Mixing Laser Diode", IEEE Transactions on Instrumentation and Measurement, Dec. 1999, vol. 58 (6), pp. 1062–1067.
Mito et al., "Self–Mixing Effect of the Semiconductor Laser Doppler Method for Blood Flow Measurement", Medical and Biological Engineering and Computing, May 1993, vol. 31, pp. 308–310.
English Language Abstract of JP–11–287699.

*Primary Examiner*—Richard A. Moller
(74) *Attorney, Agent, or Firm*—Greenblum & Bernstein, P.L.C.

(57) ABSTRACT

To enable vibration conditions of a measured object to be measured with high accuracy independently of a laser oscillating wavelength. A vibration measuring means includes a laser resonator for oscillating a laser beam and generating beat waves through self-mixture of a returning beam obtained when the oscillated emitted beam is reflected by the measured object with a beam oscillated and emitted when the returning beam is received, a modulated beat frequency generation controller 8 for providing the beat waves with a modulated beat frequency that is higher than a Doppler frequency that is superposed on the returning beam while varying depending on a speed of the measured object, and a signal processor 21 for executing signal processing on the beat waves generated by the self-mixture in the laser resonator and outputting a result of the processing as vibration information. The signal processor 21 comprises a vibration information generator 22 for generating vibration information from the beat waves by defining variations in the frequency of the beat waves as variations in frequency from a modulated beat frequency by the amount of a Doppler frequency.

15 Claims, 20 Drawing Sheets

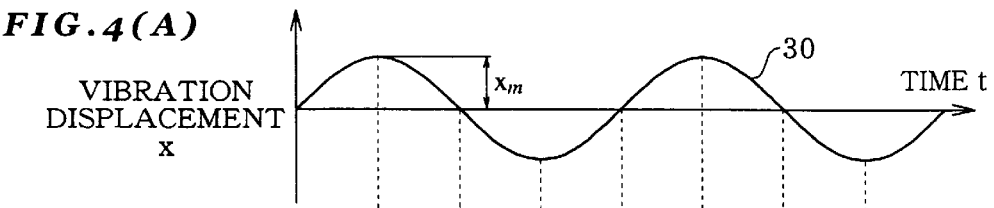
FIG.4(A)
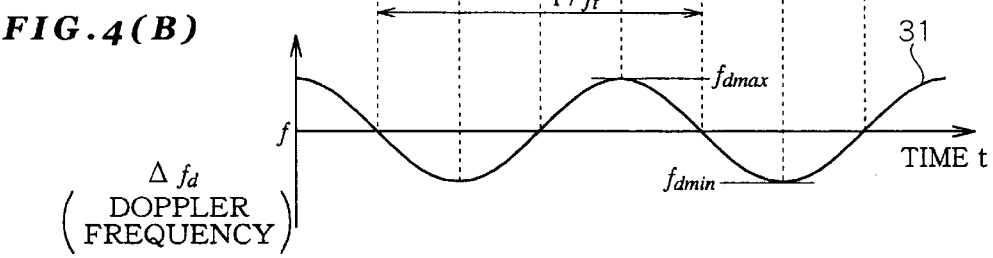
FIG.4(B)
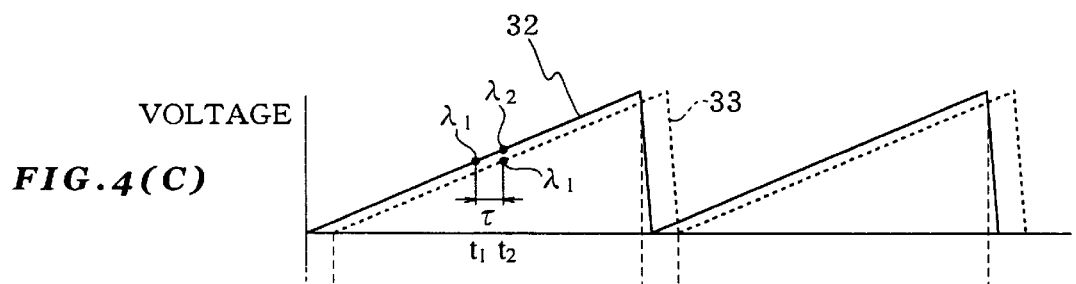
FIG.4(C)
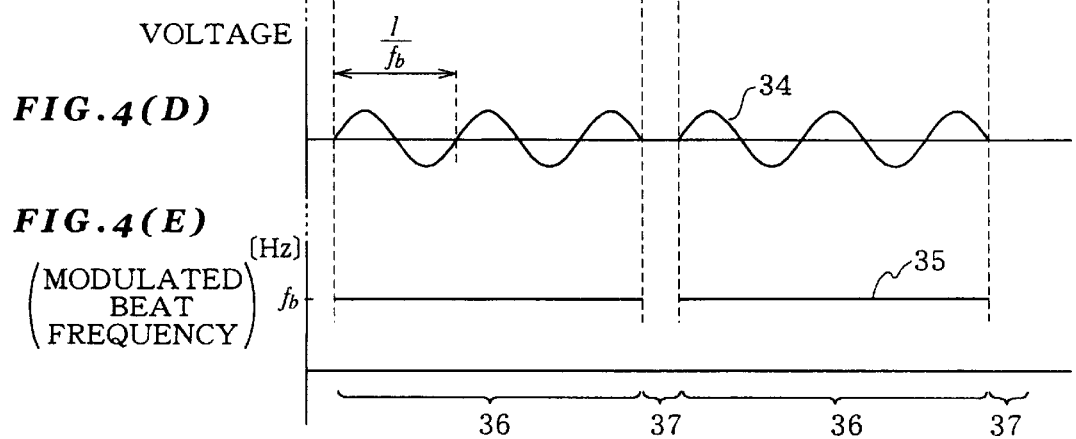
FIG.4(D)
FIG.4(E)

FIG.5
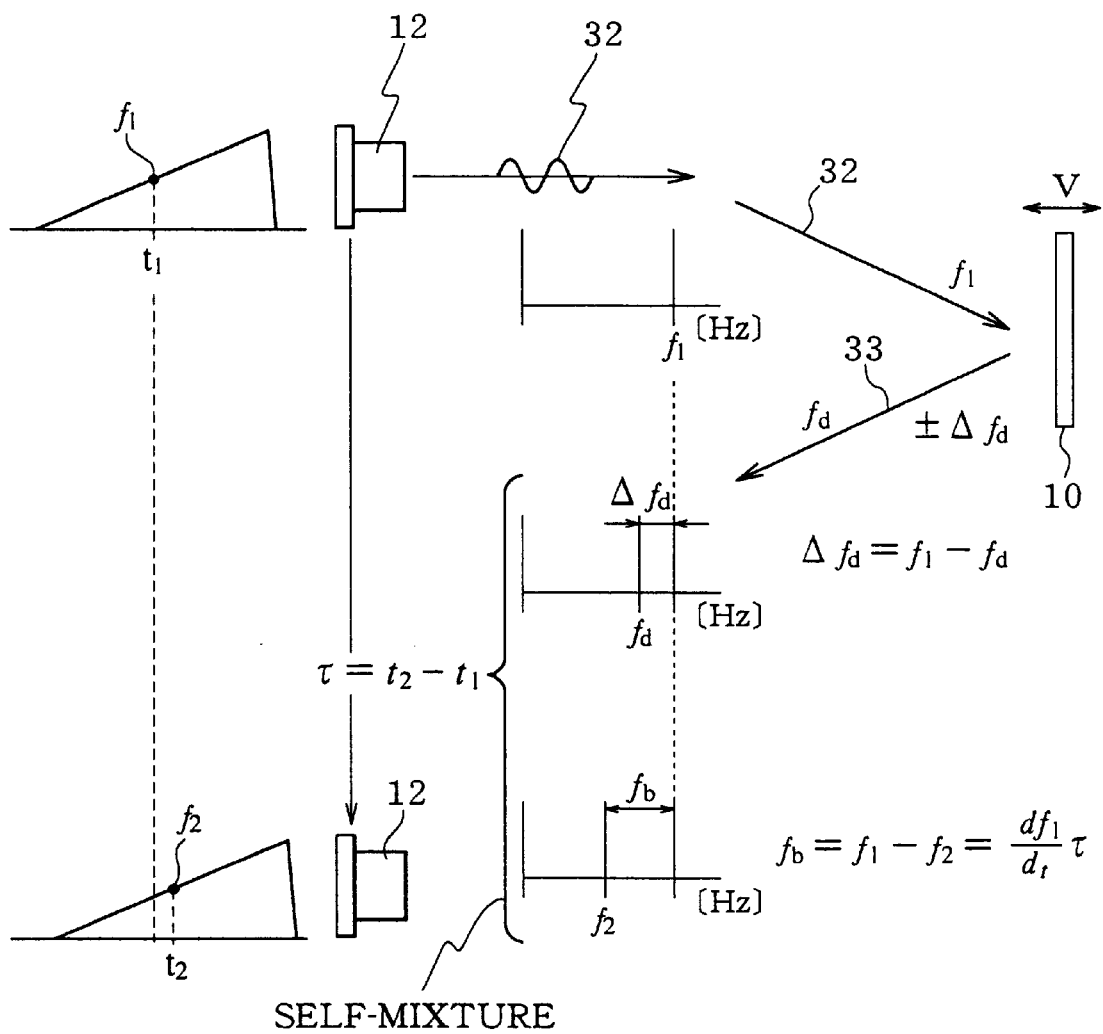
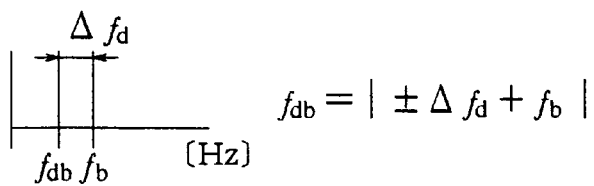

FIG. 7
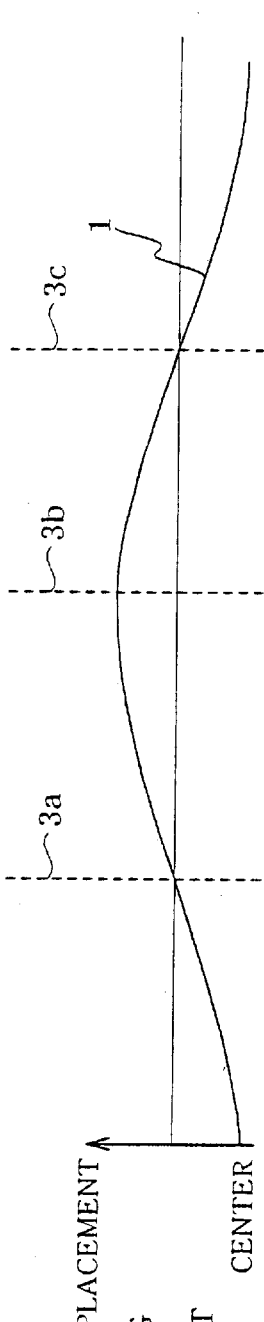
FIG 7(A)
DISPLACEMENT
VIBRATING
SURFACE
MOVEMENT
CENTER
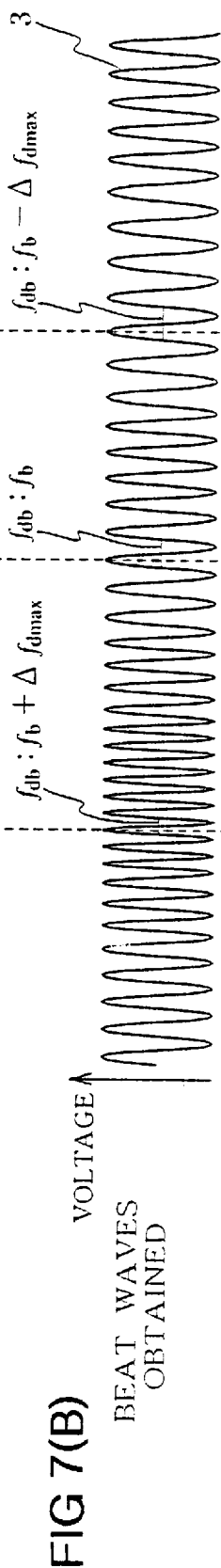
FIG 7(B)
VOLTAGE
BEAT WAVES
OBTAINED
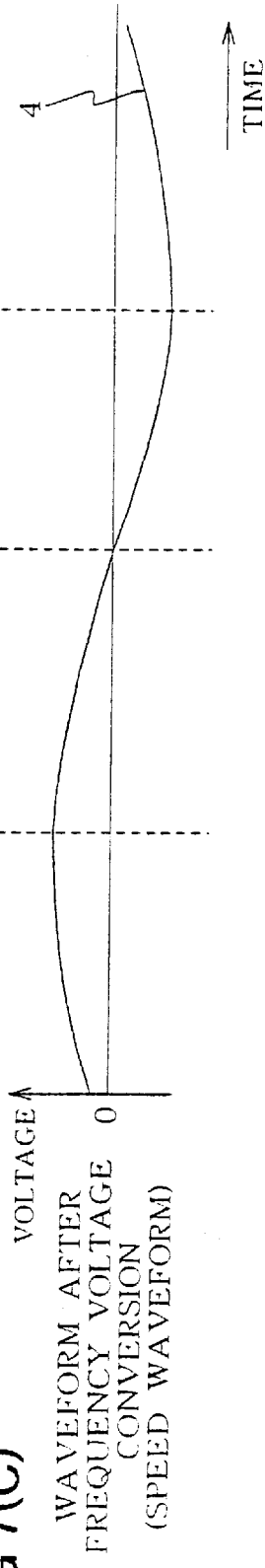
FIG 7(C)
VOLTAGE
0
WAVEFORM AFTER
FREQUENCY VOLTAGE
CONVERSION
(SPEED WAVEFORM)
TIME →

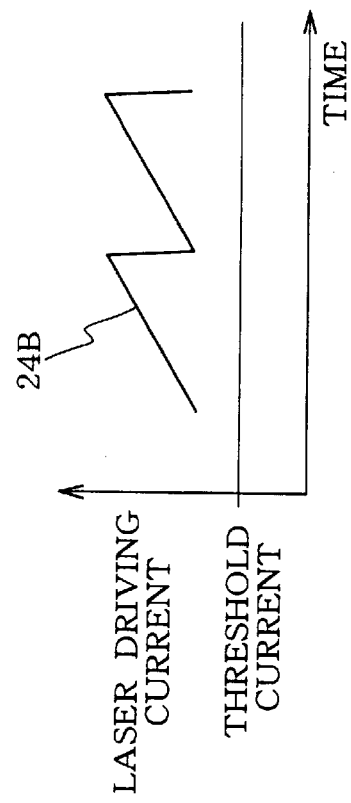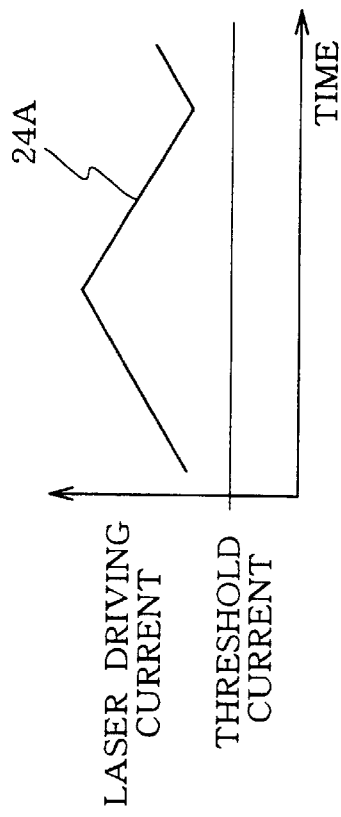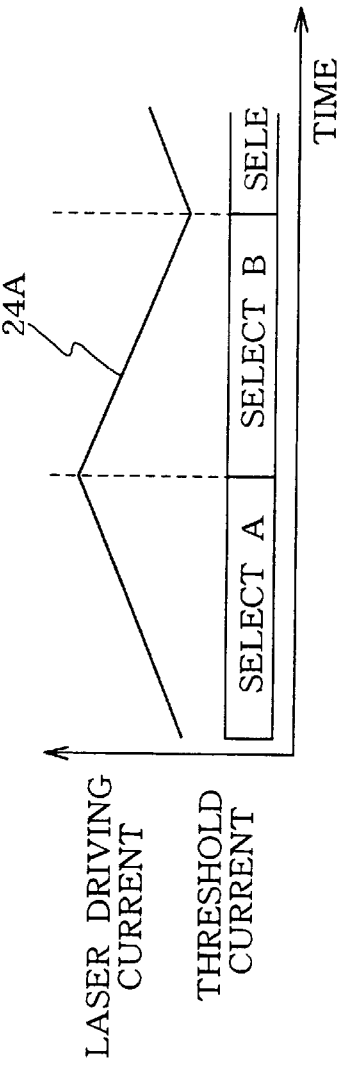

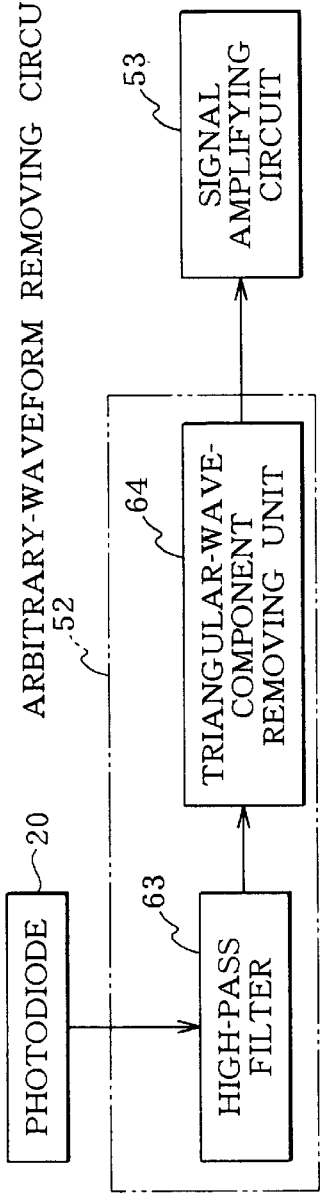
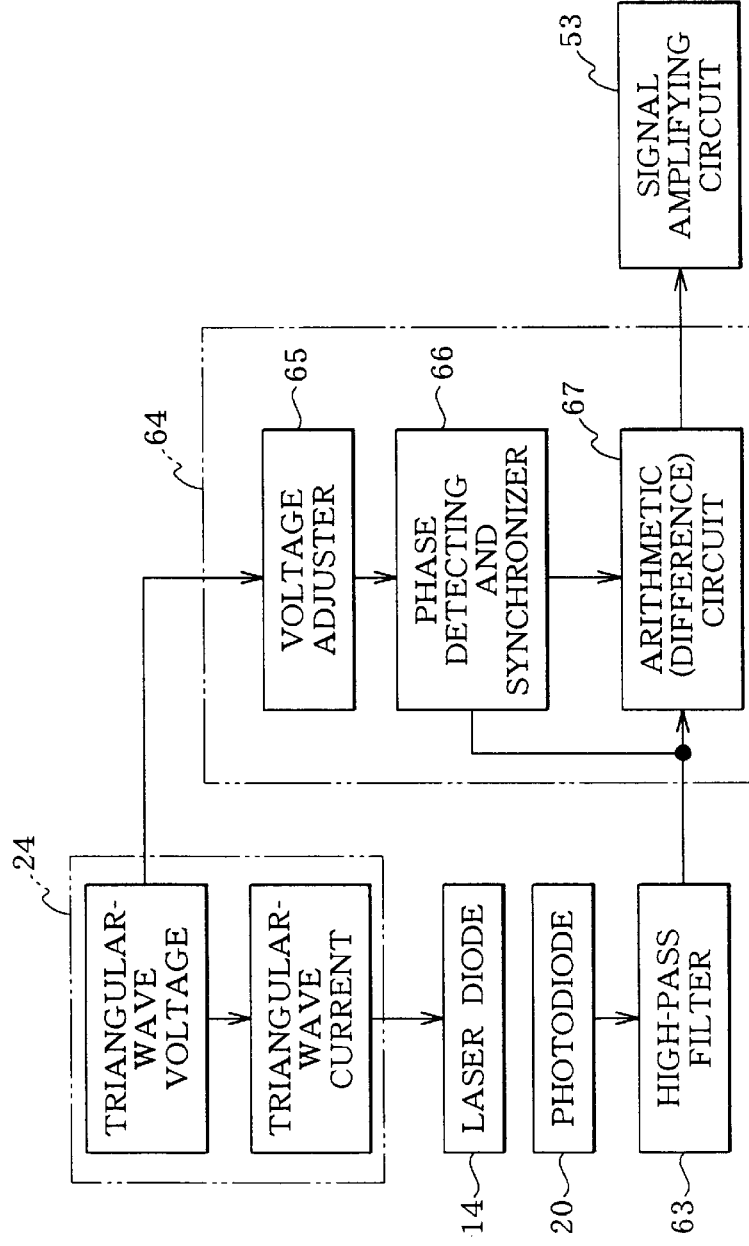
FIG.11(A)
FIG.11(B)

VIBRATION MEASURING APPARATUS AND METHOD

BACKGROUND OF THE INVENTION

1. Field of the Invention

The present invention relates to a vibration measuring method and apparatus, and in particular, to a vibration measuring method and apparatus for measuring a vibrating state of a object using a self-mixing laser Doppler vibrometer.

The present invention is applicable to various fields associated with vibration analysis. Specific applications include engine vibration analysis, body propagating vibration analysis, interior-noise analysis, and muffler vibration analysis. Other manufacturing fields have various applications. That is, the present invention can be used for maintenance such as detection of vibration in a plant using a motor or diagnosis for leakage from a water or gas pipe. Furthermore, it can be applied to agricultural fields in, for example, determining the sugar content of large fruits such as watermelons using tapping sound.

The present invention enables measurement of a vibration frequency of a very small amplitude of, for example, 200 nm or changes in the speed of a vibrating surface and is thus applicable to inspection and calibration devices for vibration generating apparatuses or to abnormal-vibration detecting devices for long-time operating power apparatuses. Such inspection and calibration devices can be used, for example, to inspect quartz or ultrasonic oscillators for frequency or to calibrate function generators. In addition, such abnormal-vibration detecting devices can be used to detect defects in semiconductor fabricating apparatuses using high-frequency vibration, the defects resulting from a failure to efficiently propagate vibration energy by resonance, or these devices can be used to detect damage to tools such as drills.

Thus, the term "measured object", as used below, refers to an object the vibration of which is to be measured, the object ranging from an engine to a tool.

2. Description of the Prior Art

Conventional means for measuring the frequency of a vibrating object in a non-contact manner include a method for determining the frequency using, for example, a laser displacement gauge to which triangulation is applied. Additionally, a vibration measuring apparatus using a laser Doppler vibrometer and provided by the applicant is disclosed in Japanese Patent Laid-Open No. 11-287699. The approach described in this publication comprises detecting beat waves based on a difference between the frequency of an emitted light and the frequency of returning light having a Doppler frequency superposed thereon depending on the speed of a measured object, and detecting the displacement of the measured object or a change in the speed thereof based on the beat waves.

The approach described in this publication measures the displacement based on the number of beat waves, utilizing the fact that one beat wave is generated each time the measured object is displaced by a length ($\lambda/2$) corresponding to the half of an oscillating wavelength $\lambda$ of the laser. Then, a reversing position of the progress direction is determined utilizing the fact that a beat wave corresponding to the reversing position has a deviating waveform and a large wavelength because the measured object is displaced by a length smaller than $\lambda/2$.

In this conventional example, however, the accuracy of vibration measurements depends on the oscillating wavelength of a laser, so that it may be disadvantageously difficult to appropriately measure a displacement smaller than $\lambda/2$ or conditions of fine high-frequency vibration having a vibration wavelength smaller than $\lambda/2$. In addition, various signal processes are required to determine the reversing position, disadvantageously resulting in an enormous number of processes to be executed if the measured object has a high frequency. Further, if the measured object generates vibration comprising a plurality of vibrations complicatedly associated with one another instead of simple harmonic oscillation, so that it may be disadvantageously difficult to accurately calculate vibration conditions depending on the approach to determine the reversing position.

BRIEF SUMMARY OF THE INVENTION

Object of the Invention

It is an object of the present invention to eliminate the disadvantages of the conventional example in order to provide a vibration measuring apparatus and method that enables vibration conditions of a measured object to be accurately measured without depending on a laser oscillating wavelength.

SUMMARY OF THE INVENTION

According to the present invention, an apparatus comprises a laser resonator for oscillating a laser beam and generating beat waves through self-mixture of a returning beam obtained when the oscillated emitted beam is reflected by the measured object with a beam oscillated and emitted when the returning beam is received, a modulated beat frequency generation controller for providing the beat waves with a modulated beat frequency that is higher than a Doppler frequency that is superposed on the returning beam while varying depending on a speed of the measured object, and a signal processor for executing signal processing on the beat waves generated by the self-mixture in the laser resonator and outputting a result of the processing as vibration information. The signal processor comprises a vibration information generator for generating vibration information from the beat waves by defining variations in the frequency of the beat waves as variations from a modulated beat frequency by the amount of a Doppler frequency. This configuration attains the above described object.

In the laser resonator, the returning beam obtained by shifting the emitted beam by an amount corresponding to the Doppler frequency depending on the speed of the measured object is self-mixed with the beam emitted when the returning beam is received, thereby generating the beat waves. At this time, the modulated beat frequency generation controller provides the beat waves with the modulated beat frequency that is higher than the Doppler frequency that is superposed on the returning beam while varying depending on the speed of the measured object. The modulated beat frequency generation controller may be adapted, for example, to provide the laser resonator with a laser driving current that varies an oscillating frequency from the laser resonator or to physically displace the laser resonator at a constant speed to generate as a modulated beat frequency a Doppler frequency that does not correspond to a movement speed that depends on the speed of the measured object.

Since the modulated beat frequency generation controller (or laser drive controller) provides the modulated beat frequency for the beat waves obtained by the self-mixture, the frequency of the beat waves (a Doppler frequency or an actually observed frequency of the beat waves) is the sum of the modulated beat frequency and the Doppler frequency that depends on the speed of the measured object. If the measured object is vibrating, since the Doppler frequency varies depending on the speed of the measured object, a beat wave corresponding to a position where the measured object reverses its moving direction has a zero Doppler frequency. At this time, the Doppler beat frequency (observed frequency) is the modulated beat frequency generated by the modulated beat frequency generation controller. Since the observed frequency of the beat wave at the reversing position is the modulated beat frequency, the beat wave at the reversing position does not deviate from its appropriate waveform.

As the measured object reverses its moving direction at the reversing position and then accelerates, the Doppler frequency varies. With a sine vibration, the speed is highest at a central position of the vibration. Accordingly, the Doppler beat frequency varies relative to the modulated beat frequency depending on variations in Doppler frequency. Thus, the beat waves are considered to be a signal obtained by means of frequency modulation using the Doppler frequency, the signal using the modulated beat frequency as a carrier frequency. Small changes in Doppler frequency can be determined by increasing the modulated beat frequency used as the carrier frequency; this means that accuracy is set irrespective of the oscillating wavelength of the laser resonator. If, for example, vibration of a measured object vibrating at a certain frequency is measured and if the modulated beat frequency is ten times as high as the vibration frequency, 10 periods of beat waves are obtained per period of the measured object, resulting in 10 pieces of Doppler frequency information.

The signal processor generates vibration information based on the beat waves. The beat waves themselves are useful as vibration information because they are a signal with a frequency modulated depending on the speed of the measured object. Additionally, a waveform obtained by subjecting the beat waves to frequency voltage conversion is a variation of the waveform of the Doppler frequency relative to the modulated beat frequency, which corresponds to a speed variation waveform. The speed variation waveform can be differentiated to obtain an acceleration variation waveform or integrated to obtain a displacement variation waveform, and the period of the speed variation waveform corresponds to a vibration period. Further, the modulated beat frequency is subtracted from the Doppler beat frequency to obtain the Doppler frequency. Then, the speed can be determined from the Doppler frequency and laser oscillating wavelength.

BRIEF DESCRIPTION OF THE DRAWINGS

FIG. 4 is a waveform diagram useful in explaining the operational principle of this embodiment. FIG. 4(A) is a diagram showing an example of a vibration waveform. FIG. 4(B) is a diagram showing an example of a Doppler frequency variation waveform (speed variation waveform). FIG. 4(C) is a diagram illustrating a difference in phase between an emitted beam and a returning beam. FIG. 4(D) is a diagram showing an example of beat waves having a modulated beat frequency corresponding to a difference in laser beam frequency caused by the phase difference shown in FIG. 4(C). FIG. 4(E) is a diagram illustrating the frequency of beat waves in a case where a measured object remains stationary;

FIG. 5 is a view useful in explaining various frequencies obtained with the configuration shown in FIG. 1;

FIG. 6 is a view useful in explaining an example of the configuration of an optical-path-length setting unit according to this embodiment.

FIG. 7 is a waveform diagram showing an example of vibration measurement according to this embodiment. FIG. 7(A) is a diagram showing an example of a vibration displacement waveform. FIG. 7(B) is a diagram showing an example of a waveform of beat waves in this case. FIG. 7(C) is a diagram showing an example of a frequency variation waveform (speed variation waveform) obtained by subjecting the beat waves to an F/V conversion;

FIG. 9 is a waveform diagram showing an example of a driving current waveform according to first embodiment. FIG. 9(A) is a diagram showing an example where a laser driving current comprises triangular waves. FIG. 9(B) is a diagram showing an example where the laser driving current comprises sawtooth waves. FIG. 9(C) is a diagram showing an example where triangular waves are selectively processed;

FIG. 11 is a block diagram showing an example of the configuration of an arbitrary-waveform removing circuit according to this embodiment. FIG. 11(A) is a diagram schematically showing the configuration. FIG. 11(B) is a diagram showing an example of a configuration for removing triangular-wave components from beat waves based on the laser driving current;

FIG. 13 is a block diagram showing an example of a configuration for generating a vibration speed waveform from beat waves according to this embodiment.

FIG. 15 is a waveform diagram useful in explaining a process according to the second embodiment.

FIG. 22 is a waveform diagram showing an example of beat waves in a stable period according to the fifth embodiment.

DETAILED DESCRIPTION OF THE PREFERRED EMBODIMENTS

Figure 1:
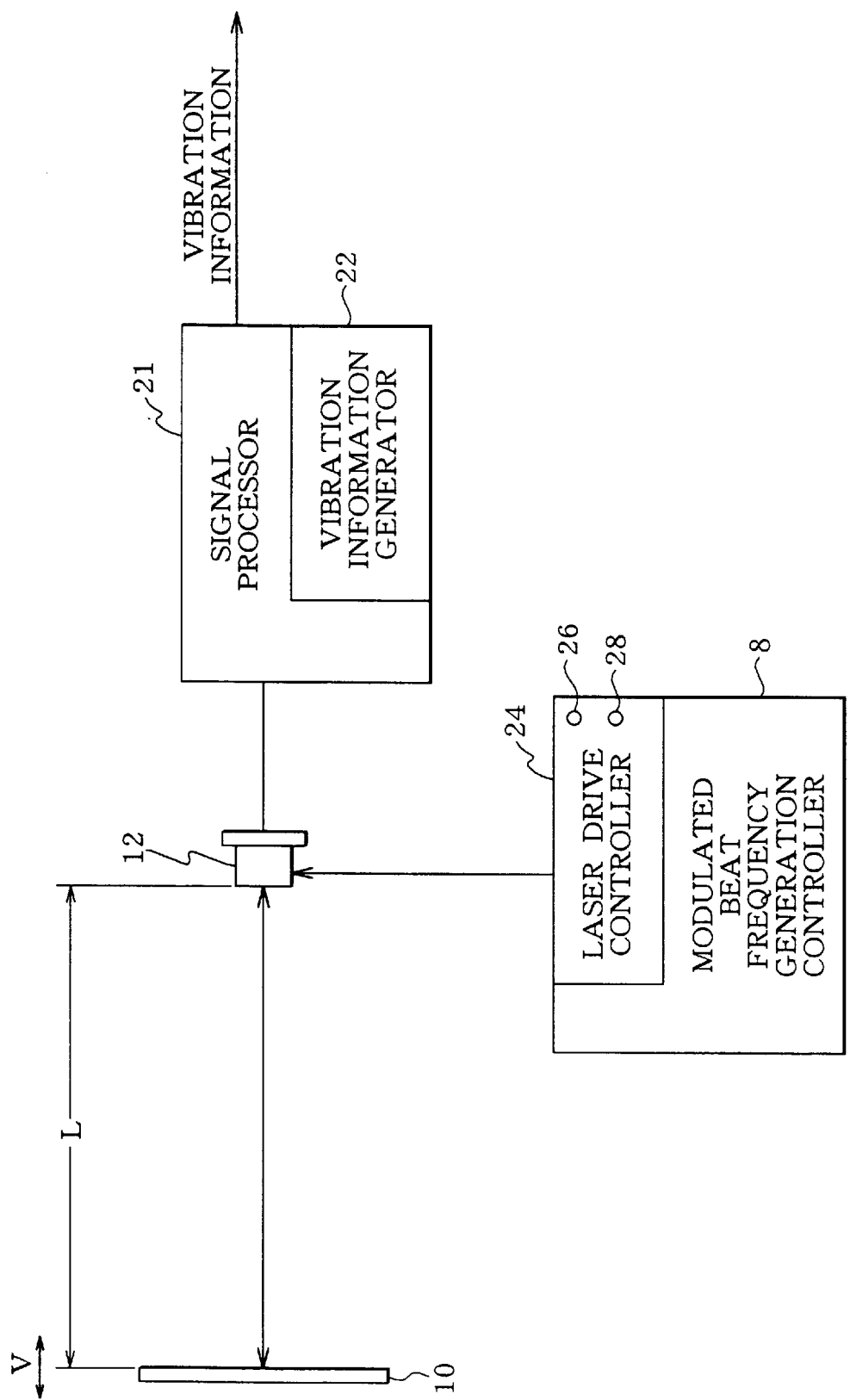
FIG. 1 is a block diagram showing the configuration of one embodiment of the present invention.

Embodiments of the present invention will be described below with reference to the drawings. FIG. 1 is a block diagram showing the configuration of one embodiment of the present invention. A vibration measuring apparatus according to this embodiment comprises a laser unit 12 having a laser resonator for oscillating a laser beam and generating beat waves through self-mixture of a returning beam obtained when the emitted beam is reflected by the measured object with a beam oscillated and emitted when the returning beam is received. The vibration measuring apparatus further comprises a modulated beat frequency generation controller 8 for providing the beat waves with a modulated beat frequency fb that is higher than a Doppler frequency that is superposed on the returning beam while varying depending on a speed of the measured object, and a signal processor 21 for executing signal processing on the beat waves generated by the self-mixture in the laser resonator and outputting a result of the processing as vibration information. The signal processor 21 comprises a vibration information generator 22 for generating vibration information from the beat waves by defining variations in the frequency of the beat waves (variations in Doppler beat frequency fdb) as variations from a modulated beat frequency fb by the amount of a Doppler frequency Δfd.

In addition, in the example shown in FIG. 1 a modulated beat frequency generation controller 8 comprises a laser drive controller 24 for controlling driving of the laser resonator in the laser unit 12 using a laser driving current of a predetermined waveform and period. The laser drive controller 24 preferably comprises a sawtooth wave generating function 26 for generating a laser driving current (see FIG. 9(B)) having a period that depends on an optical path length L to the measured object 10 and on a maximum frequency of measured vibration and having a sawtooth waveform. Alternatively, a triangular-wave generating function 28 for generating a laser driving current (see FIG. 9(A)) having a triangular wave instead of the sawtooth wave may be provided.

Figure 2:
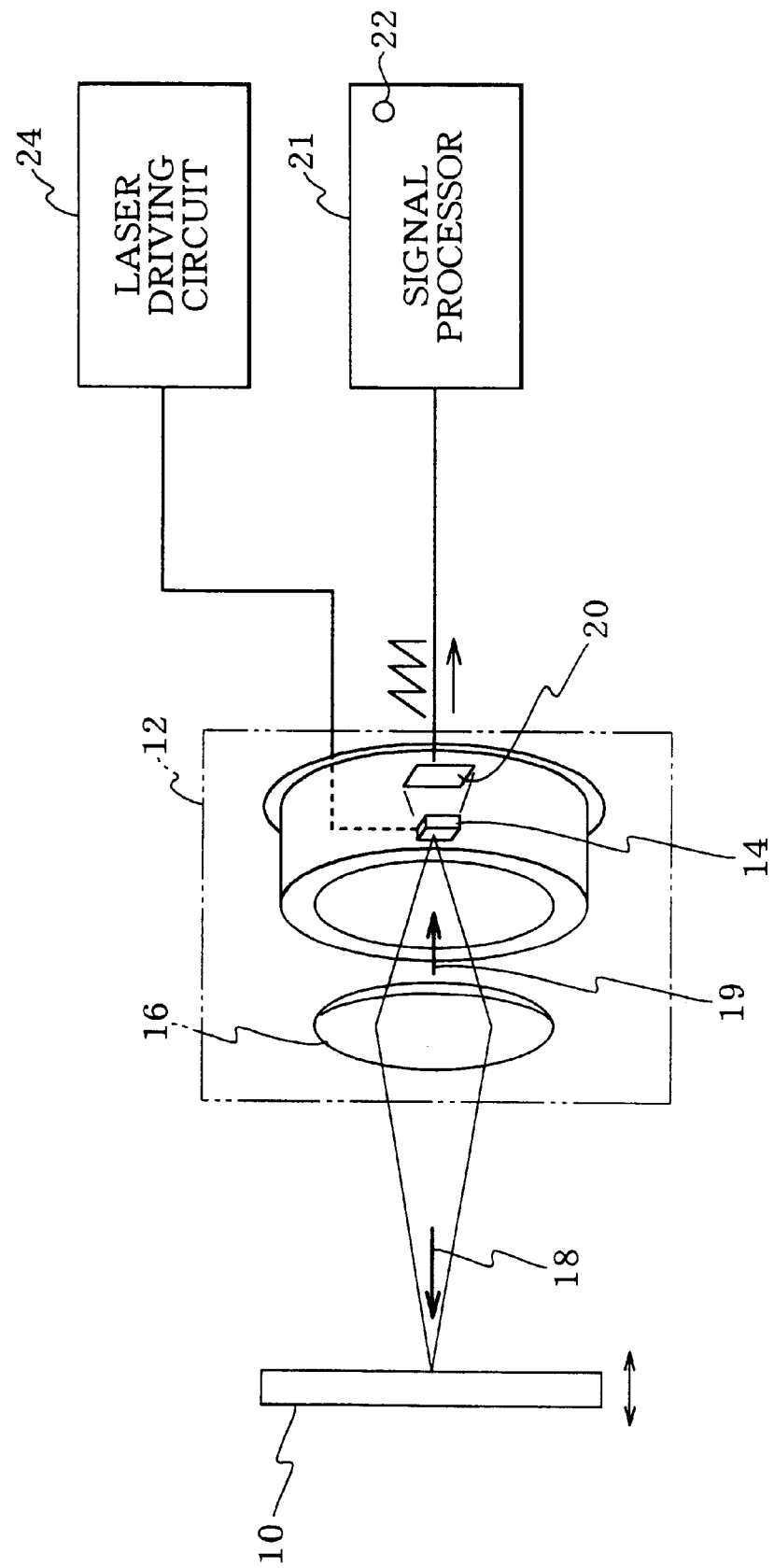
FIG. 2 is a view useful in explaining in detail the configuration of a laser configured as shown in FIG. 1.

FIG. 2 is a view useful in explaining the configuration of the vibration measuring apparatus, principally showing the detailed configuration of the laser unit 12 shown in FIG. 1. A measured object 10 is an object to be analyzed for vibration conditions, and is measured for variations in speed at a position where a laser beam is reflected, the period of the variations, a vibration frequency, and displacement. The vibration measuring apparatus comprises a laser unit 12, a lens 16 for converging an emitted beam from the laser unit 12 and a returning beam scattered from the measured object, a signal processor 21 to which beat waves are input, the beat waves being generated when the returning beam received by the laser unit 12 and the emitted beam are self-mixed together.

The laser unit 12 comprises a diode (LD) 14 having a laser resonator and a photodiode (PD) 20 for photoelectrically converting beat waves output from the laser resonator in the laser diode. The signal processor 21 has a hardware resource such as a personal computer, a microcomputer, or an analog circuit, for example, to execute signal processing on beat waves.

Figure 3:
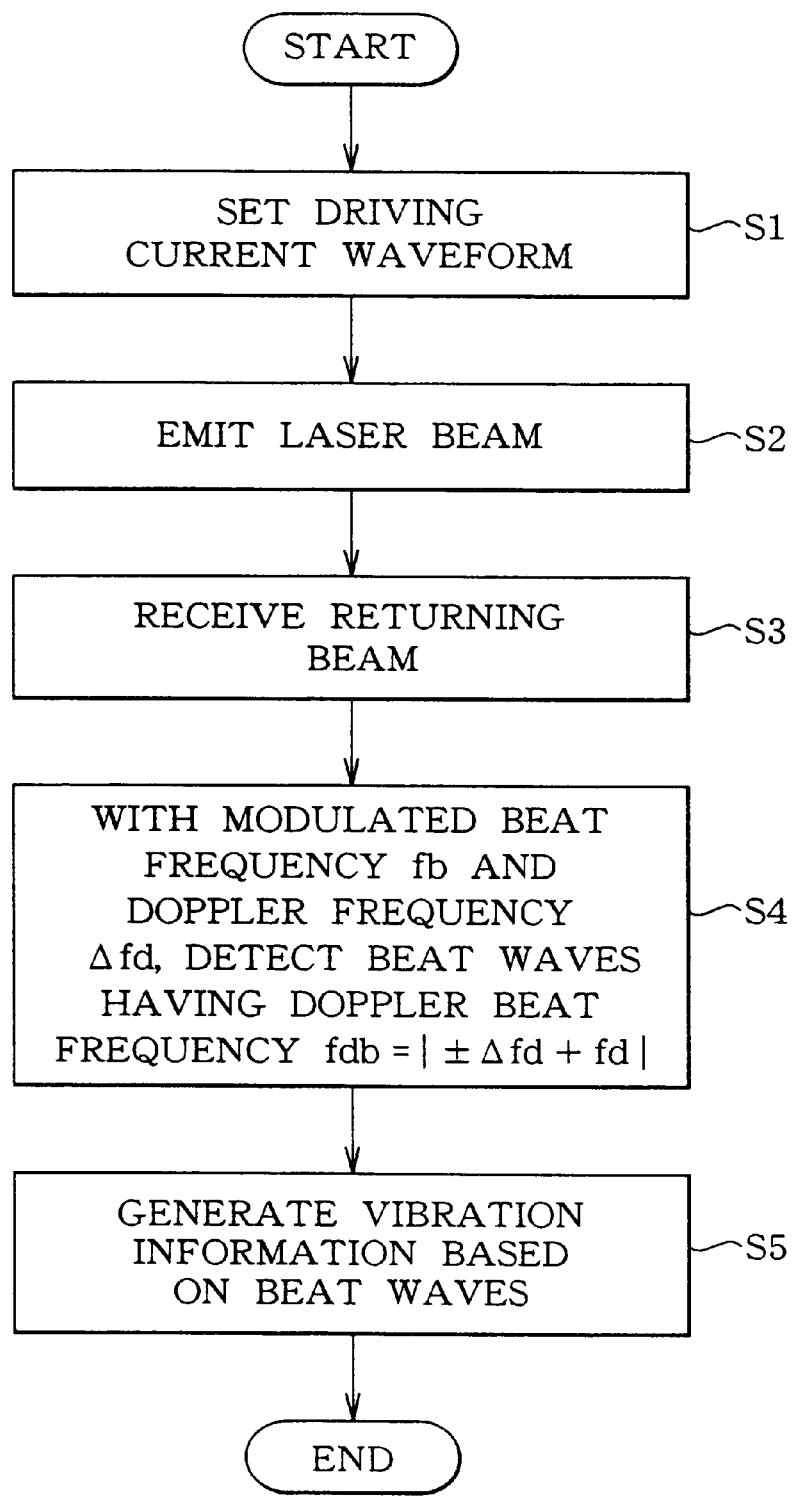
FIG. 3 is a flow chary showing an example of a process of generating vibration information using the configuration shown in FIG. 1.

FIG. 3 is a flow chart showing an example where the configuration shown in FIGS. 1 and 2 is used to generate vibration information. In the example shown in FIG. 3, the waveform and period of a driving current to the laser resonator is set based on a predetermined target modulated beat frequency $fd_{obj}$ (step S1, driving current waveform setting step). Alternatively, the distance (optical path length L) between the laser unit 12 and the measured object may be adjusted together with the driving current waveform. The target modulated beat frequency $fb_{obj}$ is preferably set depending on a maximum frequency to be measured within a single vibration period of the measured object or a plurality of superposed vibration periods thereof. If the measured object has a vibration frequency of 100 kHz and if the target modulated beat frequency $fb_{obj}$ is 800 kHz, then 8 periods of beat waves are obtained per vibration period of the measured object. If the measured object has a low vibration frequency and has a large amplitude compared to a laser oscillating wavelength, then the conventional approach results in a large number of beat waves each time the measured object reciprocates. In contrast, this embodiment can vary the accuracy of measurements by reducing the target modulated beat frequency $fb_{obj}$. Accordingly, burdens associated with signal processing can be reduced while maintaining required accuracy. In addition, when the target modulated beat frequency $fb_{obj}$ is set high, the vibration conditions can be appropriately measured even if the variation has a displacement that is smaller than half of the conventional laser oscillating wavelength ($\lambda/2$).

Thus, in this embodiment, the target modulated beat frequency $fb_{obj}$ is set depending on an upper limit of the frequency to be measured and the number of beat waves (Doppler frequency value) to be obtained within one period of the measured object. Once the target modulated beat frequency $fb_{obj}$ is set, if the optical path length L to the measured object is fixed, an actual modulated beat frequency fb can be varied by adjusting the change rate (df/dt) of the laser driving current. Accordingly, if the optical path length L has been set and the target modulated beat frequency $fb_{obj}$ is given, then the period (inclination) of the laser driving current may be varied.

When the driving current waveform is set at step S1, a laser beam is emitted (step S2, laser beam emitting step) Then, a returning beam is received after an emitted beam reciprocating time τ (step S3, returning beam receiving step). That is, at the returning beam receiving step S3, part of the returning beam scattered and reflected by the measured object section 10 after being emitted at the laser beam emitting step S2 and then traveling over the predetermined optical path length L is received.

Subsequently, beat waves are detected which have a Doppler beat frequency (fdb) corresponding to the sum of a difference in frequency (modulated beat frequency: fb) between the returning beam received at the returning beam receiving step S3 and a beam emitted when the returning beam is received and a Doppler frequency (Δfd) that depends on the movement speed of the measured object (step S4, beat wave detecting step). The Doppler beat frequency (fdb) is an observed frequency of the beat waves actually observed at the beat wave detecting step S4, and fdb=|±Δfd+fd|.

Subsequently, vibration information is generated based on the beat waves having the Doppler beat frequency fdb (step 5, vibration information generating step).

This will be described below in detail.

Measurement Principle

Relation expressions useful in explaining the operational principle of this embodiment are shown below.

[Equation 1]

$$\Delta f_d = \frac{2|V|}{\lambda} \quad (1)$$

$$\begin{pmatrix} \Delta f_d: & \text{DOPPLER FREQUENCY} \\ V: & \text{MOVING SPEED OF MEASURED OBJECT} \\ \lambda: & \text{LASER OSCILLATION WAVELENGTH} \end{pmatrix}$$

$$X = \frac{\lambda}{2} \cdot v \quad (2)$$

$$\begin{pmatrix} X: & \text{MOVEMENT} \\ v: & \text{NUMBER OF DOPPLER BEAT WAVE} \end{pmatrix}$$

$$|V| = \frac{\lambda \cdot f_d}{2} \quad (3)$$

$$f_b = \left| \frac{df}{dt} \frac{2L}{C} \right| \quad (4)$$

$$\begin{pmatrix} C: & \text{LIGHT VELOCITY} \\ \frac{df}{dt}: & \text{BEAM FREQUENCY CHANGE RATE} \\ & \text{IN PERIOD WITHOUT MODE POP} \\ L: & \text{LENGTH TO MEASURED OBJECT} \\ f: & \text{LASER OSCILLATING FREQUENCY} \end{pmatrix}$$

$$f = \frac{C}{\lambda}, \quad (5)$$

$$\frac{df}{dt} = C\frac{d}{dt}\frac{1}{\lambda}$$

$$f_b = \frac{df}{dt}\frac{2L}{C} = 2L\frac{d}{dt}\frac{1}{\lambda} \approx 2L\left(\frac{1}{\lambda_1} - \frac{1}{\lambda_2}\right)\frac{1}{\tau} \quad (6)$$

$$\tau = \frac{2L}{C} \text{ より } f_b = \tau \frac{df}{dt} \approx C\left(\frac{1}{\lambda_1} - \frac{1}{\lambda_2}\right) \quad (7)$$

$$\begin{pmatrix} \tau: & \text{EMITTED BEAM RECIPROCATING TIME} \\ f_b: & \text{MODULATED BEAT FREQUENCY} \end{pmatrix}$$

$$f_{db} = \left| \pm \Delta f_d + \left(\frac{df}{dt}\frac{2L}{C}\right) \right| \quad (8)$$

$$(f_{db}: \text{DOPPLER BEAT FREQUENCY})$$

The relationship between the Doppler frequency Δfd and the speed V of a vibrating surface of the measured object is expressed by Equation (1) by defining the laser oscillating wavelength as λ. Reference Δfd denotes the Doppler frequency, which is a difference between the frequency f of the emitted beam and the frequency fd of the returning beam, which is modulated by means of the Doppler effect. When the measured object is irradiated with a laser beam continuously oscillated with a constant driving current to generate beat waves based on the self-mixture method, the frequency of the observed beat waves equals the Doppler frequency Δfd. Integrating Equation (1) enables the relationship between the number v of beat waves and the displacement to be expressed by Equation (2). Conventionally, the displacement of the vibrating surface is calculated using half of the length of the oscillating wavelength (λ/2) as a minimum displacement by counting the number of the beat waves for the elapsed time. In addition, since the frequency of the beat waves equals to the Doppler frequency Δfd, determining the observed frequency of the beat waves enables a vibration speed V to be calculated based on Equation (3).

A low vibration frequency of the measured object results in a large vibration amplitude and a large number of beat waves generated each time the vibrating surface reciprocates. However, with a higher frequency, the vibration amplitude tends to decrease, so that less than one beat wave is often observed when the vibrating surface moves. Accordingly, in this case, it is difficult to calculate vibration displacement by counting the number of beat waves. Additionally, the vibration displacement cannot be easily measured with an accuracy lower than λ/2.

In this embodiment, the beat waves are generated using a predetermined reference, and the Doppler frequency Δfd is superposed on the modulated beat frequency fb, which constitutes this reference, to change a resolution from the oscillating wavelength to one at the modulated beat frequency fb, which constitutes the reference. This improves the measurement accuracy compared to measurements based on the oscillating wavelength. Consequently, this embodiment allows a displacement less than λ/2 to be calculated and enables measurement of the conditions of vibration of the measured object which has a high frequency and a small amplitude.

To generate the modulated beat frequency fb, which constitutes the reference, the frequency of the emitted beam and the frequency of the returning beam are made different from each other. If, for example, the resonator 14 is moved at a constant speed, a Doppler frequency is generated which differs from the Doppler frequency of the measured object and which depends on the speed of the resonator 14. Additionally, since the oscillating wavelength of the laser resonator is varied by increasing the driving current, the modulated beat frequency fb can be generated by varying the laser driving current. The modulated beat frequency fb is constant if the driving current increases at a constant rate. When the resonator is moved, the modulated beat frequency fb is constant if the speed of the resonator is constant. If the modulated beat frequency fb is to be varied, temporally varying components of the modulated beat frequency may be removed from measured Doppler beat frequency fdb while meeting the condition that the modulated beat frequency is sufficiently higher than the Doppler frequency.

The semiconductor laser resonator 14 is characterized in that the laser wavelength varies depending on the amount of driving current. This is because temperature rises to vary the oscillating wavelength in the laser resonator as the amount of current injected into an activation layer of the laser resonator increases. Accordingly, the laser wavelength is sequentially varied when the driving current for the semiconductor laser is varied at a constant rate after the returning beam from a surface of the measured object 10 has been returned to the laser resonator to thereby form an external resonator.

If the laser oscillating wavelength is varied at the constant rate and the beam reflected and scattered from the surface of the measured object 10 is then returned to the resonator 14, where it is mixed with the beam emitted when the returning beam is received, then the beat waves fb are generated while the measured object remains stopped.

When the frequency of the emitted beam is denoted by f, the rate at which the beam frequency is varied by varying the laser driving current is denoted by df/dt, the distance (length of the external resonator) to the measured object is denoted by L, and the speed of the laser beam in a measurement environment is denoted by C, the modulated beat frequency fb obtained when the measured object remains stationary is expressed by Equation (4). When both sides of the relation expression between the frequency f and wavelength λ of the emitted beam are differentiated and the beam frequency change rate df/dt is expressed in terms of a frequency change rate, Equation (5) is obtained. When Equation (5) is substituted for Equation (4), Equation (6) is obtained. An emitted beam reciprocating time τ=(2L/C) and the wavelength change rate can be approximated by a difference between a wavelength λ1 of the emitted laser beam and a wavelength λ2 of the beam emitted when the returning beam is received, so that Equation (7) is derived.

It is thus assumed that a laser beam emitted from the laser resonator, oscillating at the wavelength λ1 at an arbitrary time t1, is reflected and scattered by the surface of the measured object, separated from the laser resonator by a distance L, and then returns to the resonator at a time t2. When the laser driving current is varied at a constant rate, the laser is oscillated at the wavelength λ2 at a time t2. In the resonator, the laser beam oscillating at the wavelength λ2 and the returned laser beam at the wavelength λ1 are self-mixed together. When the photodiode then receives a beam from the resonator, beat waves that depend on a difference in wavelength originating from interference between the wavelengths λ1 and λ2 are detected as a variation in light intensity. In this manner, the modulated beat frequency fb, which is set by the increase rate of the laser driving current, the beam frequency change rate df/dt, and the emitted beam reciprocating time τ (or the distance L to the measured object and the speed C of the laser beam), can be generated while the measured object remains stationary (for example, when the moving direction of the vibration is reversed).

The distance L to the measured object varies depending on movement of the vibrating surface. If, however, the distance Lext (length of the external resonator) to the measured object which is observed when the measured object remains stationary is about 150 mm and a vibration displacement Xm is 1 μm, then Xm<<Lext and thus L≦Lext. Thus, the effects of the variation of the distance L on the change amount need not be taken into consideration.

When the beat waves has the modulated beat frequency fb while the measured object remains stationary, if the surface of the measured object has a speed, then the observed frequency (Doppler beat frequency) fdb of the beat waves is the sum of the observed beat frequency fb and the Doppler frequency Δfd (Equation (8)). If the measured object is stationary, the Doppler frequency Δfd is zero and thus the Doppler beat frequency fdb=fb. As shown in FIG. (8), when the modulated beat frequency fd is sufficiently high, its Doppler beat frequency fd equals the modulated beat frequency fb shifted by the amount of the Doppler frequency Δfd.

With a constant modulated beat frequency fb, variations in the Doppler beat frequency fdb of the beat waves detected by the photodiode 20 represent variations in the speed of the measured object 10. If, for example, the measured object 10 undergoes simple harmonic oscillation, the vibration period corresponds to the period of the Doppler beat frequency fdb. Then, the modulated beat frequency fb component can be subtracted from the Doppler beat frequency fdb to obtain the Doppler frequency db; in this case, attention must be paid to the sign of the resulting frequency. Thus, the vibration speed can be calculated and the displacement can be calculated by temporally integrating the vibration speed.

The principle of this operation will be explained again with reference to waveforms. FIG. 4(A) is a waveform diagram showing an example of a vibrating displacement waveform. In this case, vibrating displacement increases toward the resonator 14. If the measured object 10 vibrates at a frequency ft, a Doppler effect associated with the movement of the object changes the frequency of the reflected beam and the emitted beam and the returning beam are mixed together, thereby generating beat waves of the Doppler frequency Δfd as shown in FIG. 4. In the vibration shown in FIG. 4A, a maximum value $\Delta fd_{max}$ of the Doppler frequency corresponds to a maximum speed observed near the center of the amplitude of the vibration of the measured object when the latter is approaching, while a minimum value $\Delta fd_{min}$ of the Doppler frequency corresponds to a maximum speed observed when the measured object is moving away. As shown in FIG. 4B, the variation waveform of the Doppler frequency is a differential of the vibration displacement waveform, which is a speed variation waveform. In fact, multiplying the Doppler frequency by the emitted beam wavelength results in a dimension of speed.

FIGS. 4(C) to (E) are waveform diagrams useful in explaining how the modulated beat frequency fb is generated. In this case, the measured object is assumed to be stationary. The waveform shown at reference 32 in FIG. 4(C) represents variations in the wavelength of the emitted beam (variations in frequency), and the waveform shown at reference 33 represents variations in the waveform (or variations in the frequency) of the returning beam observed after the emitted beam reciprocating time τ. The emitted beam 32 emitted at the wavelength λ1 at the time t1 returns to the resonator the emitted beam reciprocating time τ later, that is, at the time t2. At this time, the emitted beam 32 has the wavelength λ2. Beat waves of the modulated frequency fb as shown at reference 34 in FIG. 4(D) are then generated depending on the difference in wavelength or frequency. If the wavelength change rate is constant, the modulated beat frequency fb is also constant as shown at reference 35 in FIG. 4(E).

As shown in FIG. 4(C), the relationship between the emitted beam frequency and the returning beam frequency is reversed at a peak and a bottom of the laser driving current. Additionally, after the peak of the laser driving current, there is no difference between the emitted and returning beam frequencies, and the modulated beat frequency becomes zero or is reversed, that is, it is inconstant. Periods when the modulated beat frequency is inconstant are referred to as inconstant periods 37 herein. Signal processing is facilitated by using the beat waves in periods 36 when the modulated beat frequency is constant and which are separate from the inconstant periods 37, as shown in FIG. 4(C).

With reference to FIG. 5, a description will be given of a process by which beat waves are generated by superposing a Doppler frequency component and a modulated beat frequency component on each other. FIG. 5 is a view useful in qualitatively explaining the relationship among the frequencies and which does not accurately show the magnitude relationship among the frequencies. This figure shows that the measured object is moving away, that the Doppler frequency Δfd has a negative sign, and that f1>fd and fdb>fb. The emitted beam 32 of the frequency f1 is emitted from the laser unit 12 at the time t1. When the beam is reflected from the measured object 10 having the speed v, the Doppler effect changes the emitted beam frequency f1 to the returning beam frequency fd. The difference between the frequencies f1 and fd corresponds to the Doppler frequency Δfd, which is positive if the speed (moving direction) of the measured object is directed to the resonator. If frequency analysis is carried out under ideal conditions, the emitted beam frequency f1 is shifted by the amount of the frequency Δfd, resulting in the returning light frequency fd.

In addition, since the laser driving current is varied, the emitted beam frequency changes to f2 at the time t2. The difference between the emitted beam frequency f1 and the frequency f2 of the beam emitted when the returning beam is received corresponds to the modulated beat frequency fb, which is defined by Equations (4), (7), or the like.

The two waves actually self-mixed inside the resonator 14 are the returning beam having the frequency fd and the emitted beam having the frequency f2 when the returning beam is received. The difference between the frequencies f2 and fd corresponds to the Doppler beat frequency fdb because the emitted beam frequency f1 is cancelled. Accordingly, the observed frequency of the beat waves resulting from the self-mixture corresponds to the sum of the modulated beat frequency fb and the Doppler frequency Δfd. The sign of the modulated beat frequency fb depends on whether the laser driving current is rising or lowering. The laser wavelength increases consistently with the laser driving current. If the a positive frequency is generated through current modulation while the driving current is increasing, the absolute value of the difference between the modulated beat frequency fb and the observed Doppler beat frequency fdb of the beat waves corresponds to the magnitude of the Doppler frequency, based on which the movement speed of the measured object can be calculated.

In addition, if the vibration period or speed is more important than the vibrating direction, the Doppler bean frequency variation waveform may be used as the speed variation waveform regardless of the moving direction of the vibrating surface of the measured object.

By generating the beat waves of the Doppler beat frequency fdb by shifting the modulated beat frequency by the amount of the Doppler frequency rather than using the Doppler frequency Δfd as the beat waves, the present invention provides the Doppler frequency Δfd much more accurately than the prior art, thereby enabling the vibration speed or period to be accurately measured. Further, when the modulated beat frequency fb is considered to be a carrier frequency of the Doppler frequency Δfd and the modulated beat frequency fb is set depending on the vibration period of the measured object, an upper limit frequency to be measured, or the like, the number of detected beat waves can be adjusted depending on the performance of the signal processor 21, thereby enabling arbitrary selection of the measuring accuracy and the amount of data required for the measurement.

Figure 6B:
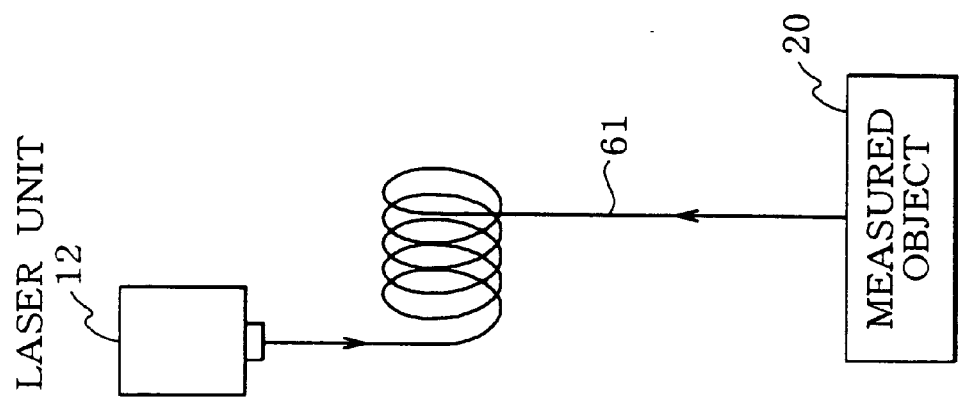
FIG. 6(B) is a view showing an example where an optical fiber is used as the optical-path-length setting unit.
Figure 6A:
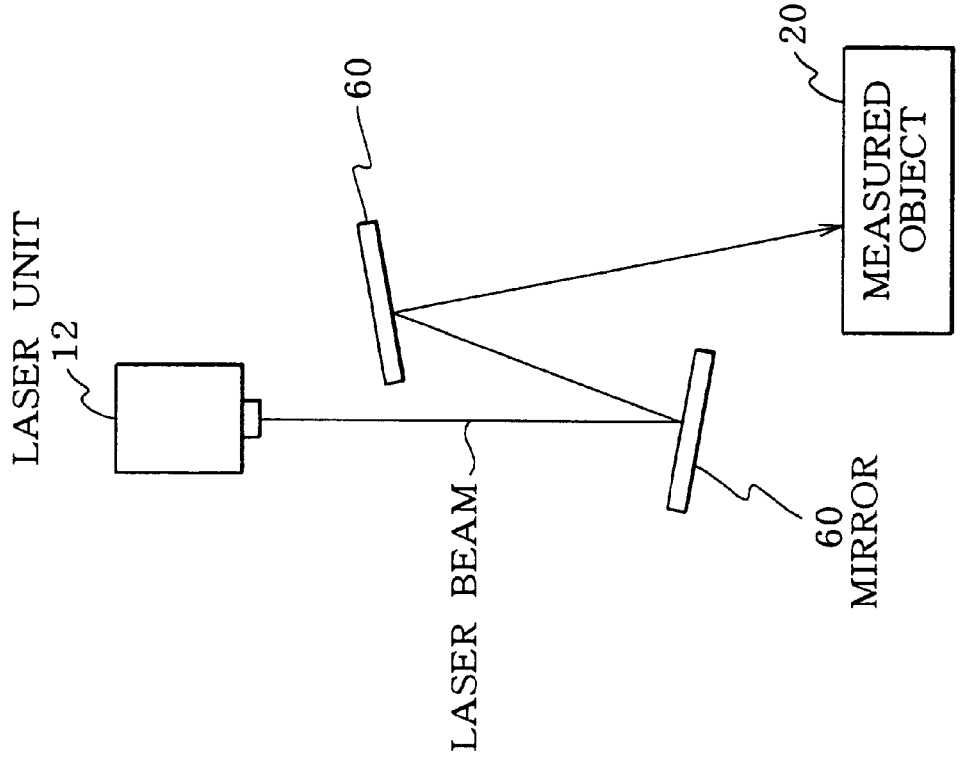
FIG. 6(A) is a view showing an example where plurality of mirrors are used as the optical-path-length setting unit.

FIG. 6 is a view useful in explaining an example of the configuration of an optical-path-length setting unit according to this embodiment. FIG. 6(A) is a view showing that a plurality of mirrors are used as the optical-path-length setting unit, and FIG. 6(B) is a view showing an example where an optical fiber is used as the optical-path-length setting unit. As shown in FIG. (4), the modulated beat frequency fb depends on the optical path length L. On the other hand, since the modulated beat frequency fb resulting from the driving current modulation must be set sufficiently higher than the Doppler frequency Δfd, the optical path length L may need to be increased. If there is no distance to the measured object, the optical path length L can be adjusted using the mirror 60 as shown in FIG. 6(A). Alternatively, as shown in FIG. 6(B), the measured object can be irradiated with the emitted beam via the optical fiber 61 so that the returning light can be guided from the measured object 10 to the laser resonator.

FIG. 7 is a waveform diagram showing an example of a vibration measurement according to this embodiment. FIG. 7(A) is a chart showing an example of a vibration displacement waveform, and FIG. 7(B) is a chart showing an example of the waveform of beat waves in this case. In the example shown in FIG. 7(A), the displacement increases toward the resonator. Thus, since at the position shown at reference 3c, the measured object is moving away and the Doppler frequency Δfd is negative, if the modulated beat frequency fb is positive and when the difference between these two frequencies is determined, the resulting Doppler beat frequency fdb has a reduced value and thus the period is longer. If the modulated beat frequency fb is negative, the relationship between the moving direction of the vibrating surface and the period of the beat waves is reversed.

At the position shown at reference 3b, the measured object reverses its moving direction, so that the speed becomes zero. At this time, the measured Doppler beat frequency fdb equals the modulated beat frequency fb generated by modulating the laser driving current. Since the beat wave maintains its appropriate waveform at this reversing point, various advantages are obtained. First, since the vibration of the measured object has a plurality of vibration periods superposed thereon, even if the measured object is displaced complicatedly, the frequency is simply modulated by the amount of the Doppler frequency relative to the modulated beat frequency, thereby enabling the vibration conditions to be appropriately measured. Furthermore, even if attenuation of the vibration of the measured object is to be measured, if the displacement of the measured object becomes zero due to attenuation, the Doppler beat frequency, corresponding to the observed frequency of the beat waves, simply becomes the modulated beat frequency and the beat waves maintain their appropriate waveform, thereby enabling the process of the attenuation to be accurately measured.

As shown in FIG. 7, when the vibration of the measured object is measured using the vibration measuring apparatus according to this embodiment, the beat waves modulated by the amount of the Doppler frequency using the modulated beat frequency as the center frequency. When these beat waves undergo an F/V conversion, the speed variation waveform shown in FIG. 7(C) is obtained. Additionally, since the Doppler frequency is obtained by subtracting the modulated beat frequency from the Doppler beat frequency and reversing the resulting sign, the direction and magnitude of the speed can be calculated.

FIRST EMBODIMENT

Signal Correction Process

Figure 8:
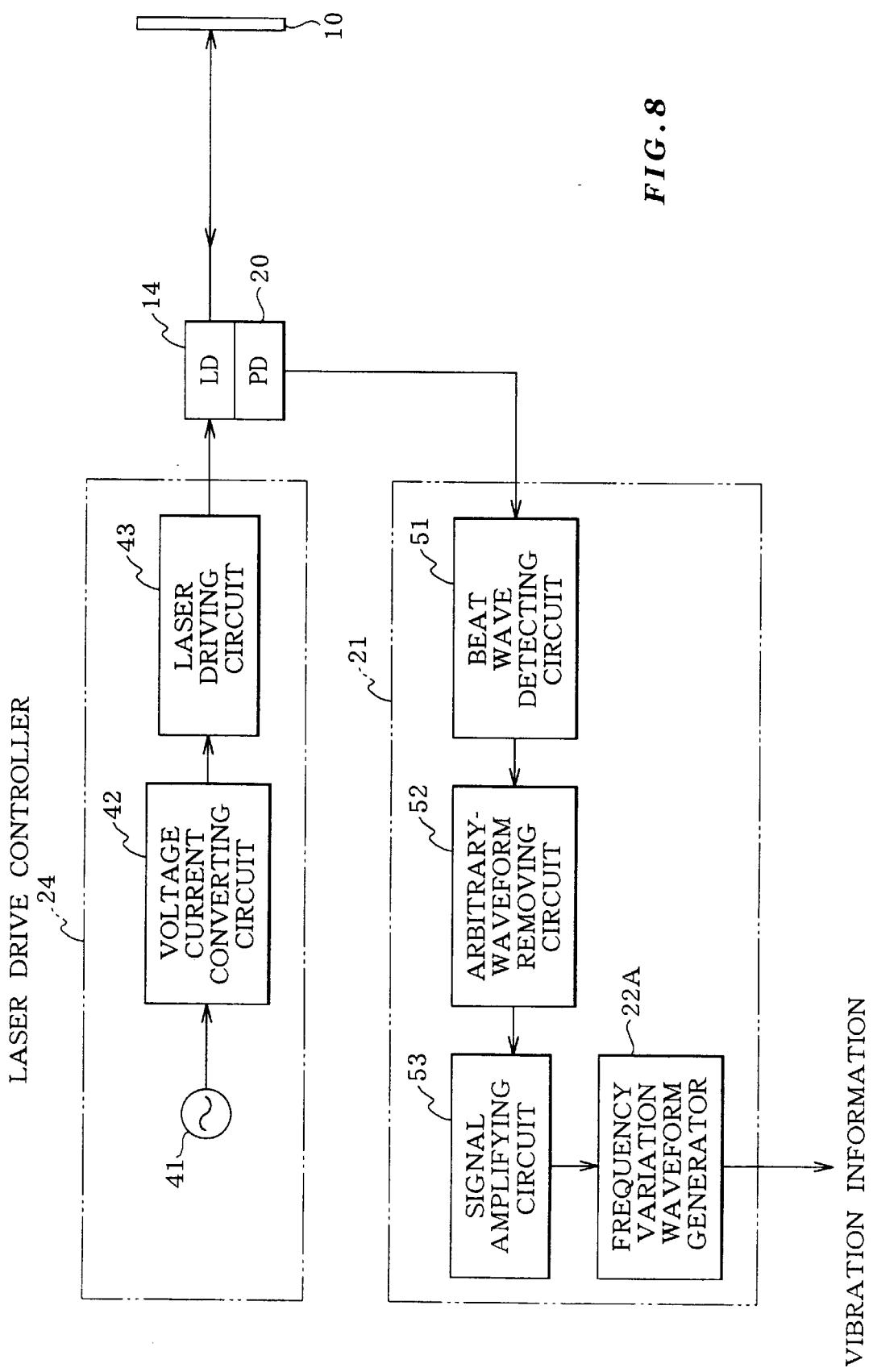
FIG. 8 is a block diagram schematically showing an example of the configuration of the embodiment of the present invention.

FIG. 8 is a block diagram schematically showing an example of a vibration measuring apparatus common to each embodiment of the present invention. In the example shown in FIG. 8, the vibration measuring apparatus comprises the laser unit 12 having the laser resonator 14 for oscillating a laser beam and causing self-mixture of a returning beam obtained when the emitted beam is reflected by the measured object with a beam oscillated and emitted when the returning beam is received, and the photodiode 20 for photoelectrically converting the beat waves generated by the self-mixture in the laser resonator.

The vibration measuring apparatus also comprises the laser drive controller 24 for controlling driving of the laser resonator using a laser driving current of a predetermined waveform and period, and the signal processor 21 for detecting beat waves of the modulated beat frequency fb corresponding to a difference in frequency between an emitted beam and a returning beam which difference occurs in the resonator 14 depending on variations (df/ft) in laser beam oscillating wavelength caused by temporal variations in laser driving current and on the period τ between the emission of the emitted beam and the reception of the returning beam.

The signal processor 21 further comprises a frequency variation waveform generator 22A for generating as a frequency variation waveform, variations in Doppler frequency Δfd which depend on the speed of the measured object and which are superposed on the modulated beat frequency fb of the beat waves. In addition, the signal processor 21 comprises a beat wave detecting circuit 51 for detecting beat waves from a PD output signal, an arbitrary-waveform removing circuit 52 for removing large light intensity varying components from the PD output signal detected by the beat wave detecting circuit 51, the components varying similarly to the laser driving current, and a signal amplifying circuit 53 for amplifying the signal from which the modulated components have been removed by the arbitrary-waveform removing circuit 52. The signal amplified by the signal amplifying circuit 53 is then input to a frequency variation waveform generator 22A as the above described beat waves.

FIG. 9 is a waveform diagram showing an example of a driving current waveform according to the first embodiment. FIG. 9(A) is a diagram showing an example where the laser driving current comprises triangular waves, and FIG. 9(B) is a diagram showing an example where the current comprises sawtooth waves. If the laser driving current varies by a constant amount, the frequency resulting from modulation associated with the driving current is constant. Accordingly, when the measured Doppler beat frequency fdb of the beat waves changes, a change in Doppler frequency Δfd which depends on the speed of the measured object is immediately known, thereby facilitating determination of the vibration conditions. Consequently, the waveform (temporal variations) of the driving current preferably comprises periodically repeated straight lines having a fixed inclination as shown in FIG. 9(A) or (B). Although the sawtooth wave-like driving current waveform shown in FIG. 9(B) is easy to process in terms of removal of the laser driving current or calculation of the modulated beat frequency fb, triangular waves having symmetrical inclinations as shown in FIG. 9(A) may be used. With the triangular waves, predetermined signal processing is required in calculating the Doppler speed because the increase or decrease in modulated beat frequency depends on whether a straight portion of the waveform has a positive or a negative inclination. Therefore, for the simplification of the signal processing, the waveform is preferably the sawtooth wave having one inclination extending long as shown in FIG. 9B.

Figure 10:
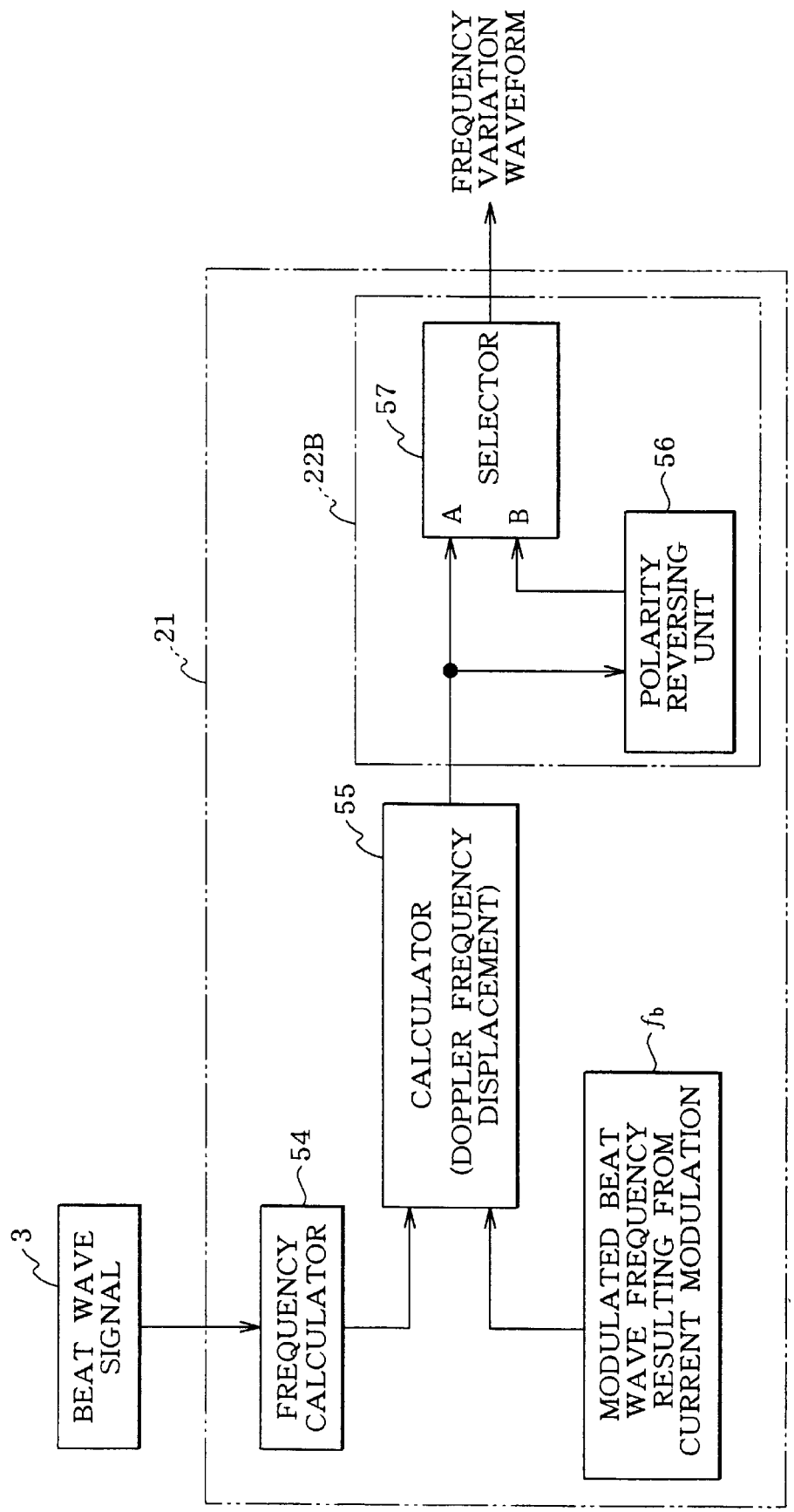
FIG. 10 is a block diagram showing an example of the configuration of a vibration information generator according to this embodiment.

When the triangular wave in FIG. 9A is used as a driving current and if both positive and negative inclinations are measured, the frequency process must be selected depending on whether the waveform has a positive or a negative inclination. FIG. 10 is a block diagram showing an example of the configuration of a vibration information generator in a case where a triangular wave is used as a laser driving current waveform. For example, a select period is set depending on whether the driving current is rising or lowering, as shown in FIG. 9(C). Measured Doppler frequencies can be uniformly processed by passing each of them through a calculator corresponding to the select period.

In the example shown in FIG. 10, the signal processor 21 comprises a frequency calculator 54 for calculating the frequency (Doppler beat frequency) fdb of a beat wave signal 3, a calculator 55 for calculating the Doppler frequency Δfd using the modulated beat frequency fb resulting from the modulation of the laser driving current, and a period-by-period signal processor 22B for extracting a Doppler frequency from each of rising and falling periods if the laser driving current has a triangular waveform. In the example shown in FIG. 10, the period-by-period signal processor 22B comprises a plurality of reversing unit 56 for reversing the polarity (sign) of the Doppler frequency Δfd calculated by the calculator 55 and a selector 57 for selecting a Doppler frequency or a Doppler frequency with a reversed polarity depending on the timings shown in FIG. 9(C). The Doppler frequency Δfd is output in accordance with time series to output a frequency variation waveform.

FIG. 11 is a block diagram showing the configuration of an arbitrary-waveform removing circuit according to this embodiment. FIG. 11(A) is a view schematically showing a configuration, and FIG. 11(B) is a view showing an example of a configuration for removing triangular components from the beat wave based on the laser driving current. In the example shown in FIG. 11(A), an arbitrary-waveform removing circuit 52 shown in FIG. 8 comprises a high-pass filter 63 for passing high-frequency components to remove DC components, and a triangular-wave component removing unit (driving current component removing unit) 64 for removing light intensity varying components from the signals passing through the high-pass filter 63, the components varying similarly to the laser driving current. The triangular-wave component removing unit 64 functions as a sawtooth wave component removing unit if the driving current has a sawtooth waveform.

Electric signals associated with the variations in laser beam intensity (PD output signals) detected by the photodiode 20 are passed through a filter 63 to obtain only AC components. The extracted signals contain triangular components proportional to the driving current waveform because the laser beam intensity increases and decreases consistently with the driving current. Since the triangular components are very large compared to beat waves, they (sawtooth wave components) must be removed before signal amplification.

Specifically, the driving current components can be removed by providing a triangular voltage corresponding to the triangular or sawtooth wave of the driving current, adjusting the amplitude through amplification or the like, and subtracting the adjusted voltage from the PD output signal synchronously therewith. The example shown in FIG. 11(B) comprises a voltage adjuster 65 for adjusting the voltage of a triangular voltage waveform generated by the laser drive controller 24 such that it is substantially the same as the voltage of triangular wave components of the PD output signal, a phase detecting and synchronizer 66 for detecting the phase of the PD output signal and synchronizing the detected phase with the phase of the signal having its amplitude adjusted by the voltage adjuster 65, and an arithmetic circuit 67 for subtracting the triangular-wave signal having its phase adjusted by the phase detecting and synchronizer 66 from a portion of the PD output signal passing through the high-pass filter to extract only beat waves having the Doppler beat frequency.

Figure 12:
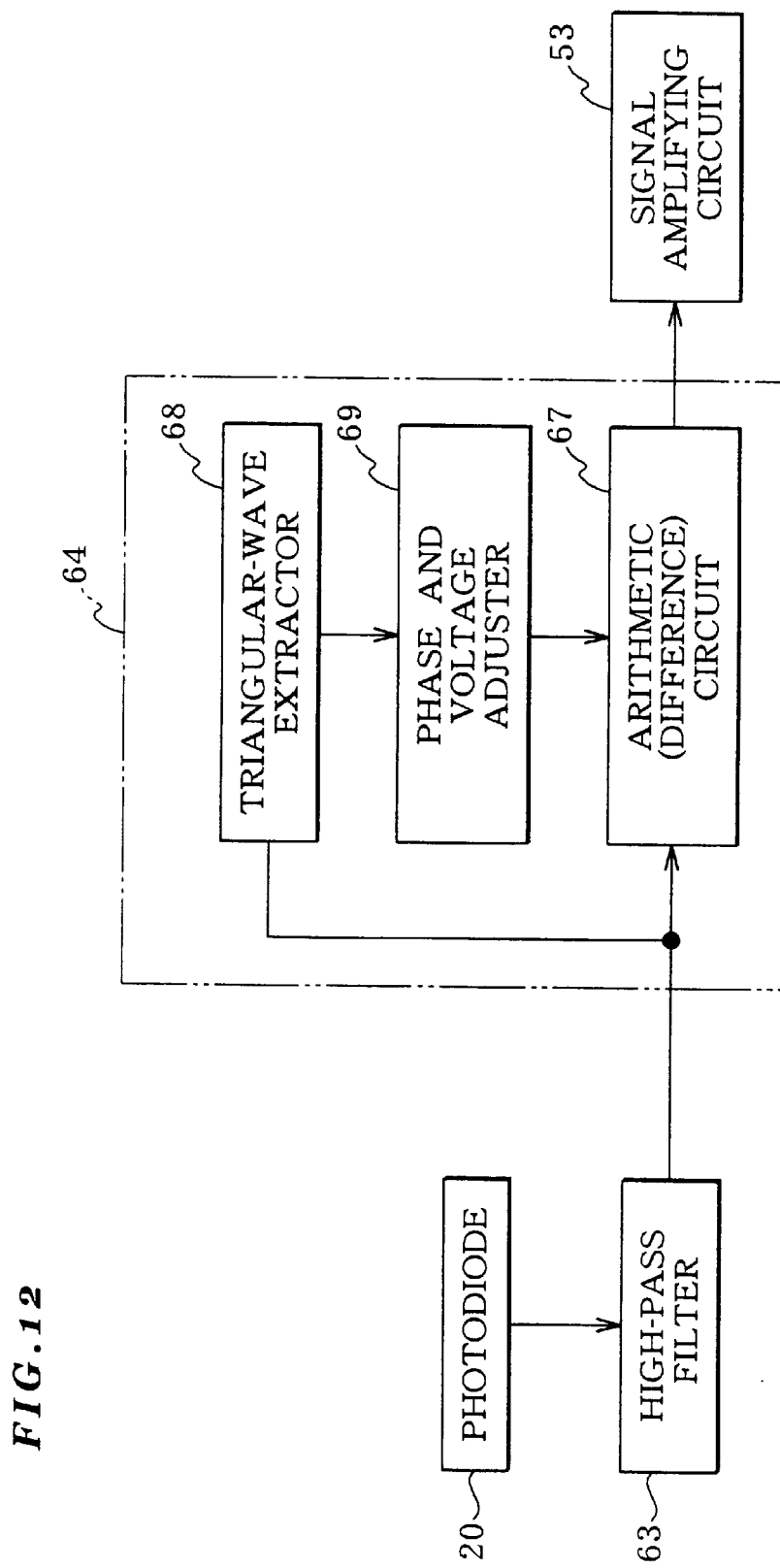
FIG. 12 is a block diagram showing another example of the arbitrary-waveform removing circuit according to this embodiment.

FIG. 12 is a block diagram showing another example of the arbitrary-waveform removing circuit 52. In the example shown in FIG. 12, only triangular components are extracted from the PD output signal and after voltage and phase adjustments, the triangular components are subtracted from the signal. In the example shown in FIG. 12, the triangular-wave component removing unit 64 comprises a triangular-wave extractor 68 for extracting triangular-wave components from the portion of the PD output signal passing through the high-pass filter 63, a phase and voltage adjuster 69 for adjusting the phase and voltage of the triangular waveform extracted by the triangular-wave extractor 68, and a calculator 67 for subtracting signal components output from the phase and voltage adjuster 69 from the portion of the PD output signal passing through the high-pass filter 63.

The triangular-wave components can also be removed from the PD output signal by setting a cutoff frequency for the high-pass filter 63 depending on the period of the driving current waveform. That is, since there is a difference in frequency between the beat waves and the variations in driving current and the beat waves have a higher frequency, the high-pass filter 63 can be used to remove from the signal the triangular-wave components arising from the variations in driving current.

In the examples shown in FIG. 11 and 12, the triangular-wave components associated with the driving current are removed from the PD output signal, which is then amplified. Thus, only the beat wave components can be used over a wide band. For example, for conversion into a digital signal, the resolution of an A/D converter can be maximally used.

SECOND EMBODIMENT

Calculation for Frequency Variations

Figure 13A:
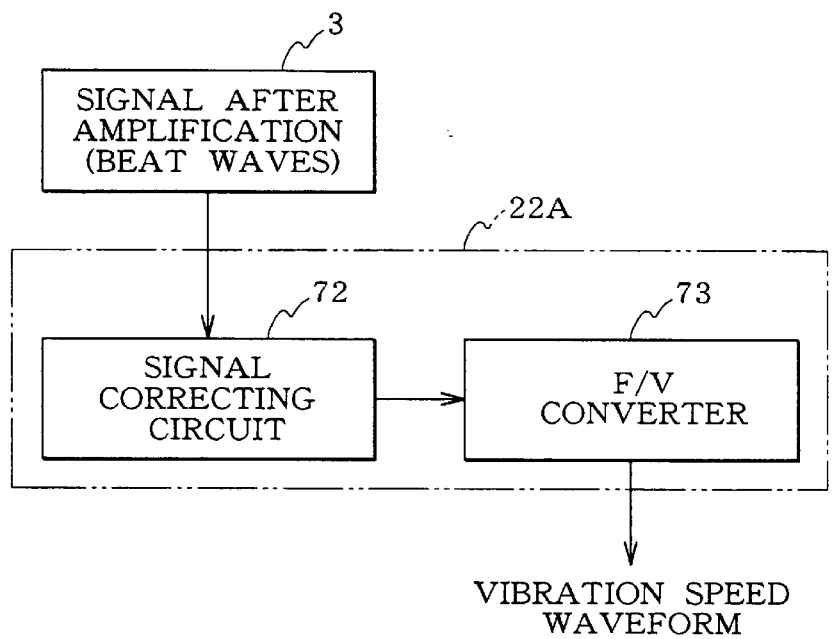
FIG. 13(A) is a diagram showing an example of a configuration for outputting variations in Doppler beat frequency as variations in vibration speed.

In a second embodiment, a configuration for calculating a frequency variation waveform from beat waves will be described in detail. FIG. 13(A) is a diagram showing a configuration for outputting variations in Doppler beat frequency as variations in vibration speed. Since the observed frequency of beat waves corresponds to the difference between the Doppler frequency Δfd and the modulated beat frequency fb, if the modulated beat frequency fb is constant, variations in Doppler beat frequency can be used as a speed variation waveform indicating a speed of zero at the modulated beat frequency. In the example shown in FIG. 13(A), the frequency variation waveform generator 22A comprises a signal correcting unit 72 for correcting amplified beat waves for inconstant periods or the like and an F/V converter 73 for converting the frequency of beat waves output from the signal correcting circuit into a voltage. The configuration shown in FIG. 13(A) can be implemented in an analog circuit and is suitable for applications for measuring abnormal vibration of the measured object in real time.

Figure 13B:
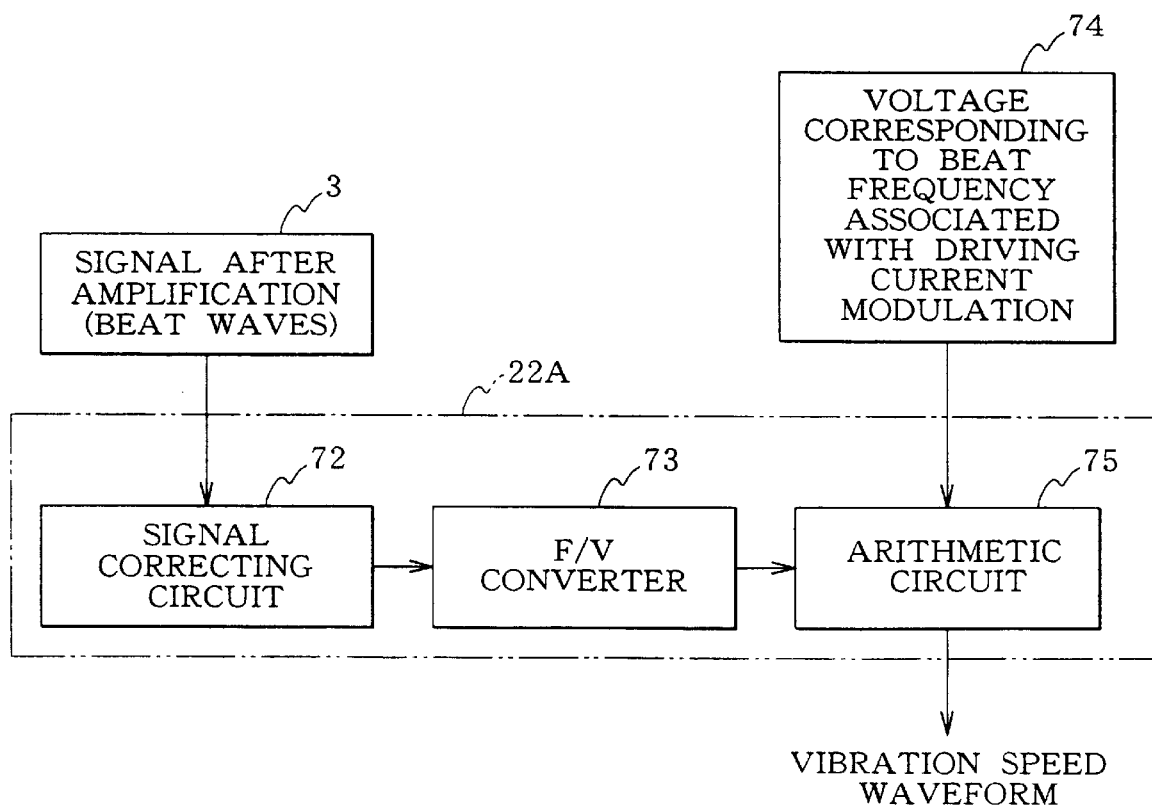
FIG. 13(B) is a diagram showing an example of a configuration for outputting variations in Doppler beat frequency as variations in vibration speed.

FIG. 13(B) is a diagram showing an example of a configuration for outputting variations in Doppler frequency Δfd as variations in vibration speed. In the example shown in FIG. 13(B), modulated beat frequency components fb are removed instead of variations in Doppler beat frequency fdb to generate a frequency variation waveform composed of only doppler frequency components Δfd. In the example shown in FIG. 13(B), the frequency variation waveform generator 22A comprises, in addition to the configuration shown in FIG. 13A, an arithmetic circuit 75 for removing the modulated beat frequency fb from a variation waveform of the Doppler beat frequency fdb output from the F/V converter 73. The arithmetic circuit 75 outputs as vibration information, a variation waveform of the Doppler frequency, a speed variation waveform obtained by multiplying the variation waveform by a wavelength, a displacement variation waveform obtained by integrating the speed variation waveform, or the like.

The Doppler frequency may be calculated by multiplying an amplified signal (beat waves) by a modulated beat frequency previously obtained by means of current modulation and measuring the resulting envelope.

Figure 14:
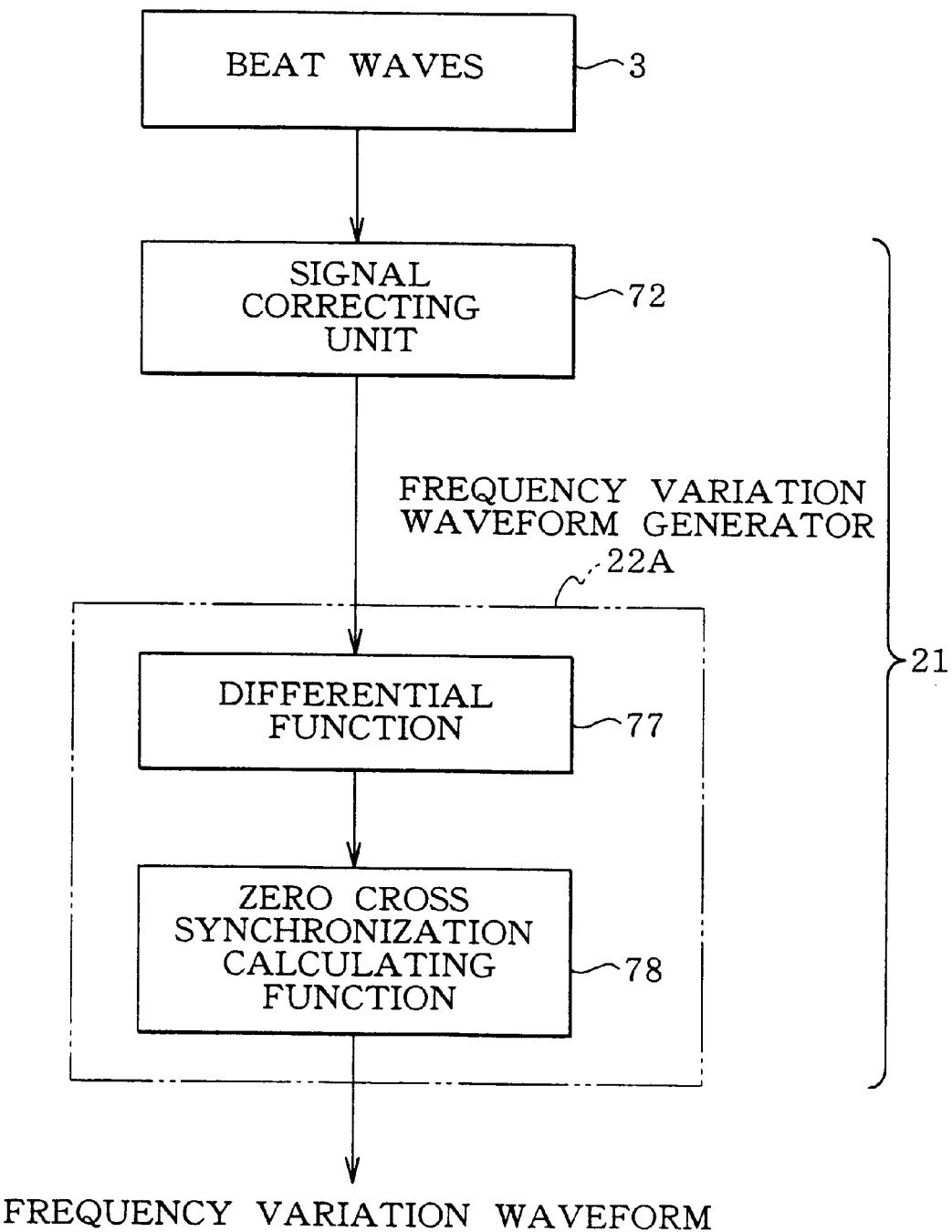
FIG. 14 is a block diagram showing an example of the configuration of a signal processor according to a second embodiment of the present invention.

FIG. 14 is a block diagram showing an example of the configuration of the signal processor according to the second embodiment of the present invention. In the example shown in FIGS. 14 and 15, a digital signal process is used to output a frequency variation waveform. Specifically, the period of beat waves is numerically and temporally determined from beat wave data. For example, the period of the waveform may be determined by differentiating the beat waves to determine peaks of the waveform and observing a peak-to-peak time, or measuring sections where the beat waves themselves traverse an arbitrary voltage.

The peak-to-peak period measurement is not affected by central voltage variations but by noise. The example where measurements are made of sections where the beat waves traverse an arbitrary voltage is affected by central voltage variations but not relatively affected by noise. Thus, the period of the waveform can be accurately calculated by selecting the approach depending on signal conditions.

In the example where the beat waves are differentiated, the waveform is preferably averaged beforehand to avoid the adverse effects of noise. The peaks of the waveform may be determined by differentiating a signal averaged to remove noise therefrom so that the peaks can be determined as points where the differential value traverses a zero line from a positive side to a negative side. The peaks may be determined as points where the differential value traverses the zero line from the negative side to the positive side.

For noise prevention, it is effective that if the interval between the points where the differential value traverses the zero line from the positive side to the negative side is shorter than a predictable beat wavelength, the interval between two contiguous points is accumulated as the period. In addition, if the inclination of the waveform observed when the differential value traverses the zero line from the positive side to the negative side is steeper than a predictable value, this may be determined to be noise and neglected.

In the example where the period of the beat waves is directly determined, means for averaging a wider range of the signal is used to determined a central voltage so that the interval between points where the beat waves traverse this voltage line from the positive side to the negative side (or vice versa) can be measured.

In the example where differentiated beat waves obtained by differentiating the beat waves are used to generate a frequency variation waveform, the frequency variation waveform generator 22A comprises a differential function 77 of differentiating the beat waves and a zero cross period calculating function 78 of calculating as a frequency variation waveform, variations in period in which the beat waves differentiated by the differential function 77 cross the zero line, as shown in FIG. 14. Further, with a function of shaping the inverse of the value of the period detected by the zero cross period detecting function 78, a frequency variation waveform (speed variation waveform of the measured object) can be generated.

Figure 15A:
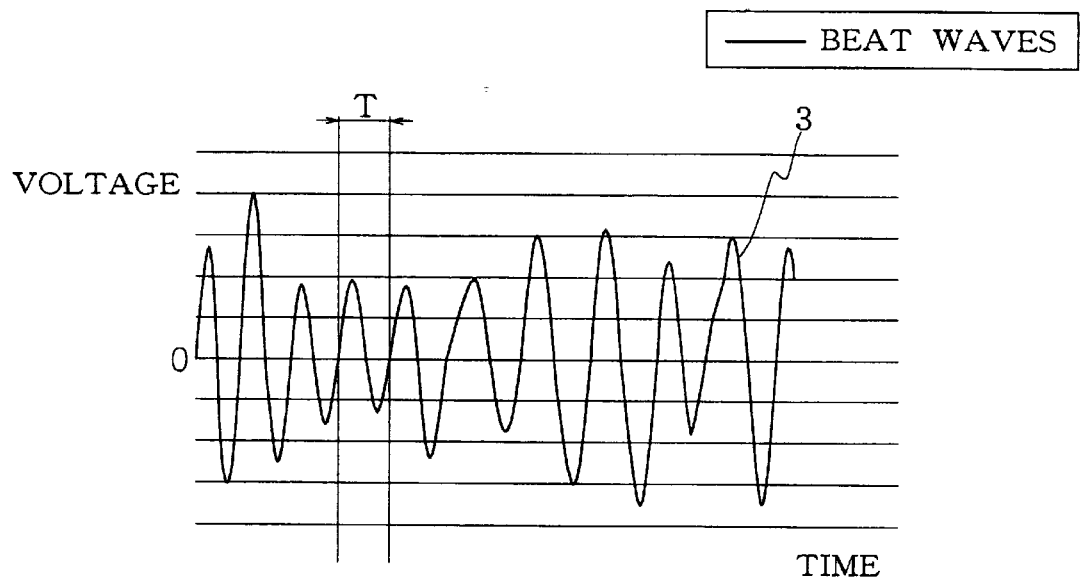
FIG. 15(A) is a diagram showing an example where the period of beat waves is directly determined.
Figure 15B:
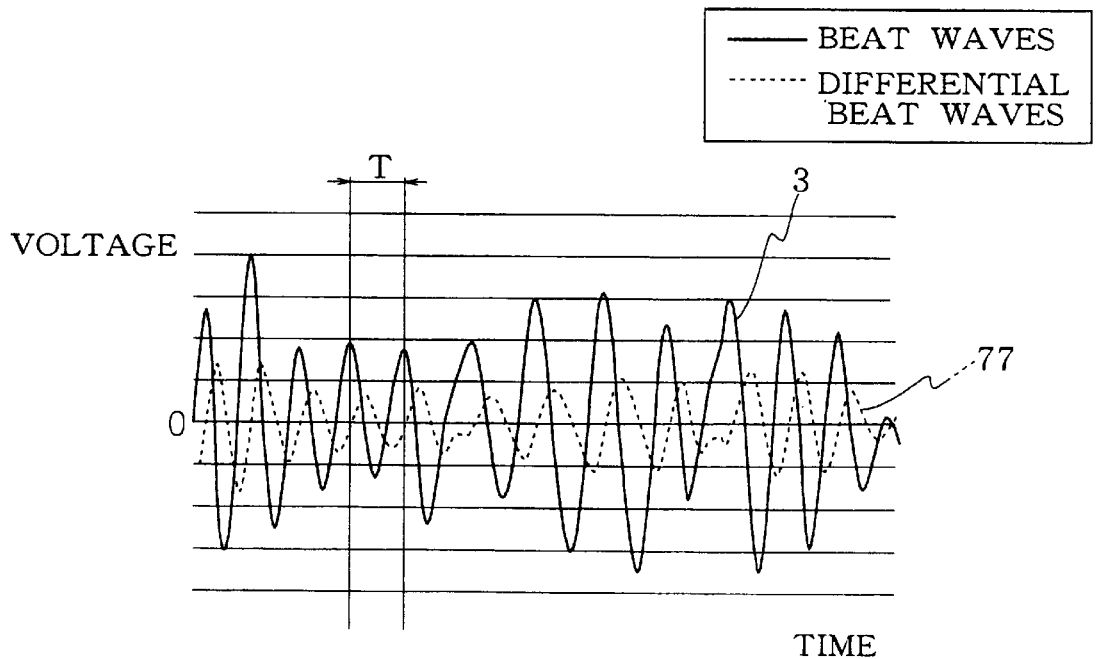
FIG. 15(B) is a diagram showing an example where the period of differentiated beat waves is determined.

FIG. 15(A) is a chart showing an example where the period of the beat waves is directly determined, and FIG. 15(B) is a chart showing an example where the period of the differentiated beat waves is determined. In the example shown in FIG. 15(A), the period T is determined by detecting positions where the beat waves cross the zero line from the negative side to the positive side. In the example shown in FIG. 15(B), the configuration shown in FIG. 14 is used to differentiate the beat waves and the positions where the differentiated beat waves cross the zero line from the negative side to the positive side is detected, thereby determining the peak-to-peak period T.

THIRD EMBODIMENT

Calculation for Frequency Spectrum

Figure 16:
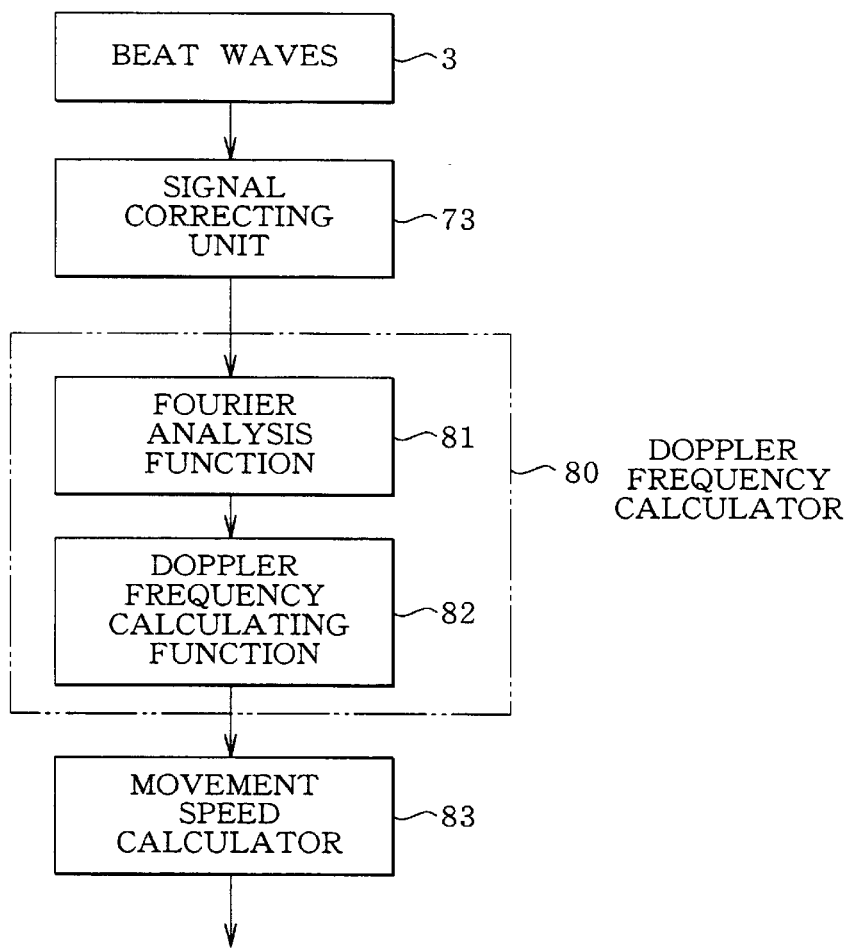
FIG. 16 is a block diagram showing an example of the configuration of a third embodiment of the present invention.

In a third embodiment, an example where beat waves are analyzed for frequency will be essentially described. FIG. 16 is a block diagram showing an example of the configuration of the third embodiment of the present invention. In the example shown in FIG. 16, the signal processor 21 comprises a signal correcting unit 72 for removing noise from beat waves, a Fourier analysis function 81 of determining a frequency spectrum of the beat waves, and a Doppler frequency calculating function 82 of calculating a maximum or minimum value of a Doppler frequency that depends on the speed of the measured object, based on a spectrum width around the beat frequency of the frequency spectrum generated by the Fourier analysis function 81.

Figure 17:
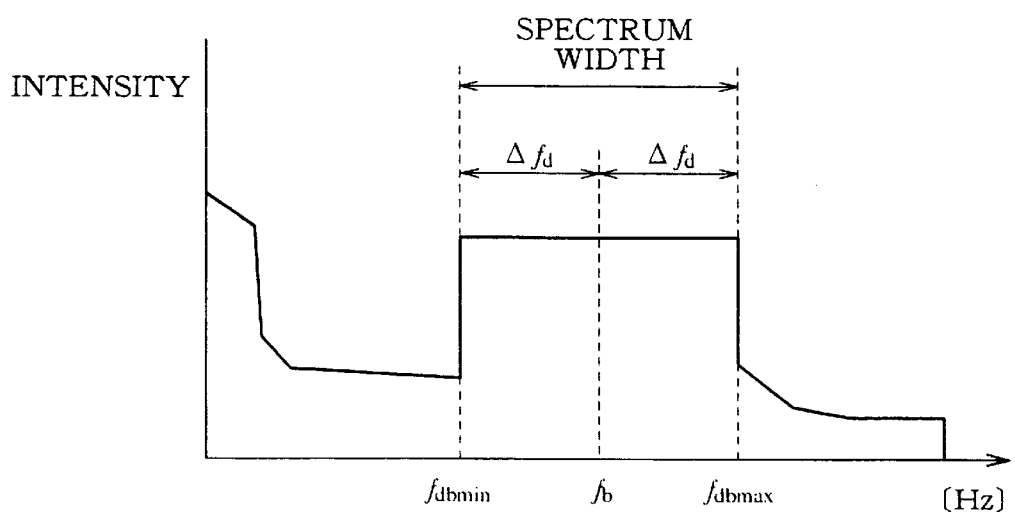
FIG. 17 is a spectrum diagram showing an example of a frequency spectrum of beat waves used in the third embodiment.

FIG. 17 is a spectrum diagram showing an example of a frequency spectrum of beat waves used in the third embodiment. The distribution of frequencies of the beat waves under ideal conditions is observed when the frequency is shifted by the amount of the Doppler frequency $\Delta fd$ relative to the modulated beat frequency fb generated by means of current modulation. Thus, the modulated beat frequency fb obtained by modulating the driving current corresponds to the center of a spectrum width obtained by subjecting the signal to the Fourier analysis, and a minimum Doppler frequency $\Delta fd_{min}$ or a maximum Doppler frequency $\Delta fd_{max}$ corresponds to the absolute value of a frequency obtained by subtracting the modulated beat frequency fb from a minimum frequency $fbd_{min}$ or a maximum frequency $fbd_{max}$ in the spectrum width.

Thus, when the beat waves 3 are subjected to the Fourier analysis using an approach such as FFT, the modulated frequency fb and the maximum Doppler frequency $\Delta fd_{max}$ can be determined from the measured beat waves. Once the maximum Doppler frequency $\Delta fd_{max}$ is found, a maximum movement speed of the measured object can be calculated using Equation (3).

Referring back to FIG. 16, the signal processor comprises a frequency calculator 80 for calculating the absolute value of a difference between the modulated frequency fdb of the beat waves and the central modulated beat frequency fb as the Doppler frequency $\Delta fd$ that depends on the speed of the measure object, and a movement speed calculator 83 for calculating the speed of the measured object based on the Doppler frequency $\Delta fd$ calculated by the Doppler frequency calculator 80. The Doppler frequency calculator 80 uses the FET in the example shown in FIG. 16, but the Doppler frequency may be extracted by removing a previously calculated or measured modulated beat frequency from the observed frequency of the beat waves.

FOURTH EMBODIMENT

Plural Resonators

Figure 18:
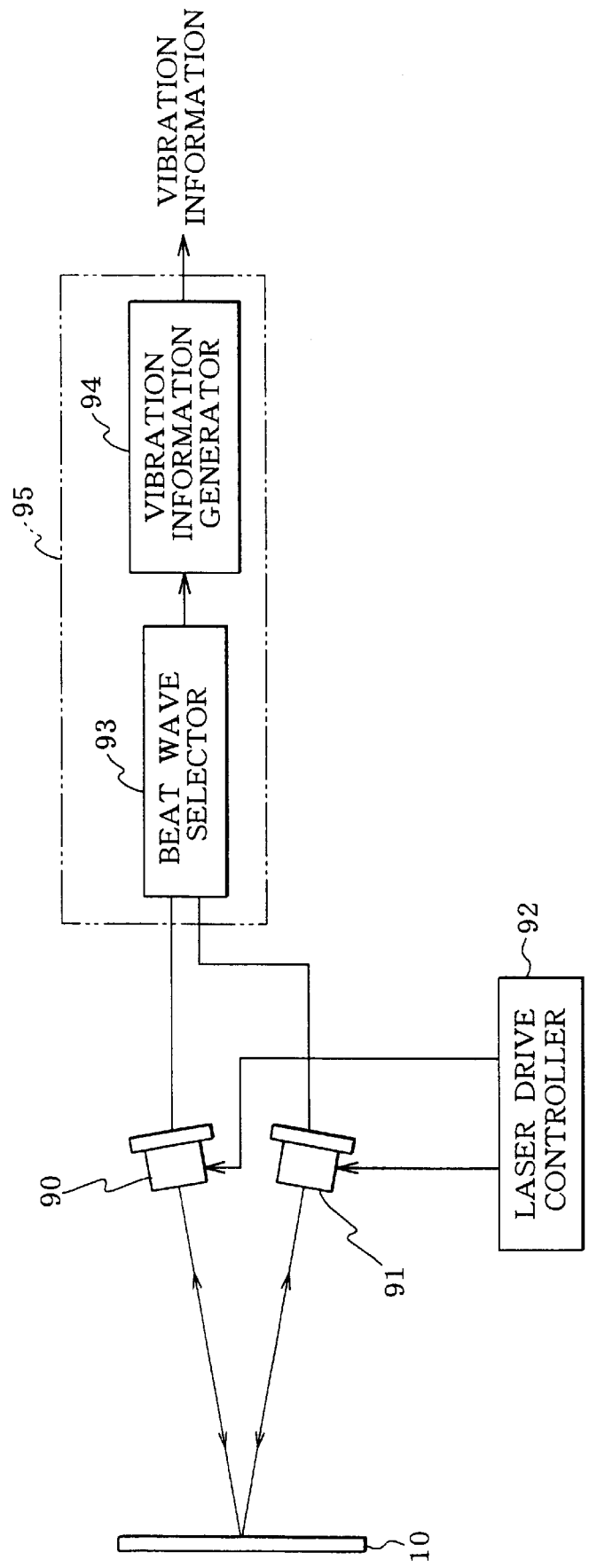
FIG. 18 is a block diagram showing an example of the configuration of a fourth embodiment of the present invention.

In a fourth embodiment, a plurality of laser resonators are used to enable continuous vibration measurements without using beat waves in the inconstant period which depend on the waveform of the laser driving current. FIG. 18 is a block diagram showing an example of the configuration of the fourth embodiment of the present invention. A vibration measuring apparatus according to this embodiment comprises a plurality of laser resonators 90 and 91 for oscillating a laser beam and causing self-mixture of a returning beam obtained when the oscillated emitted beam is reflected by the measured object with a beam oscillated and emitted when the returning beam is received, a laser drive controller 92 for controlling driving of each of the plural laser resonators 90 and 91 using a corresponding laser driving current of a corresponding predetermined waveform and phase, and a signal processor 95 for using as the modulated beat frequency fb a difference in frequency between the emitted beam and the returning beam which occurs in each of the plural resonators, to detect beat waves having the Doppler frequency $\Delta fd$ superposed thereon, the Doppler frequency depending on the movement speed of the measured object.

The signal processor 95 comprises a beat wave selector 93 for selecting those of the beat waves occurring in each of the plural resonators 90 and 91 which occur in the laser resonator 90, which does not have an inconstant period 37 when the modulated beat frequency fdb is inconstant in conjunction with the phase and period of the laser driving current, and a vibration information generator 94 for generating vibration information on the measured object based on the beat waves selected by the beat wave selecting section 93.

Figure 19:
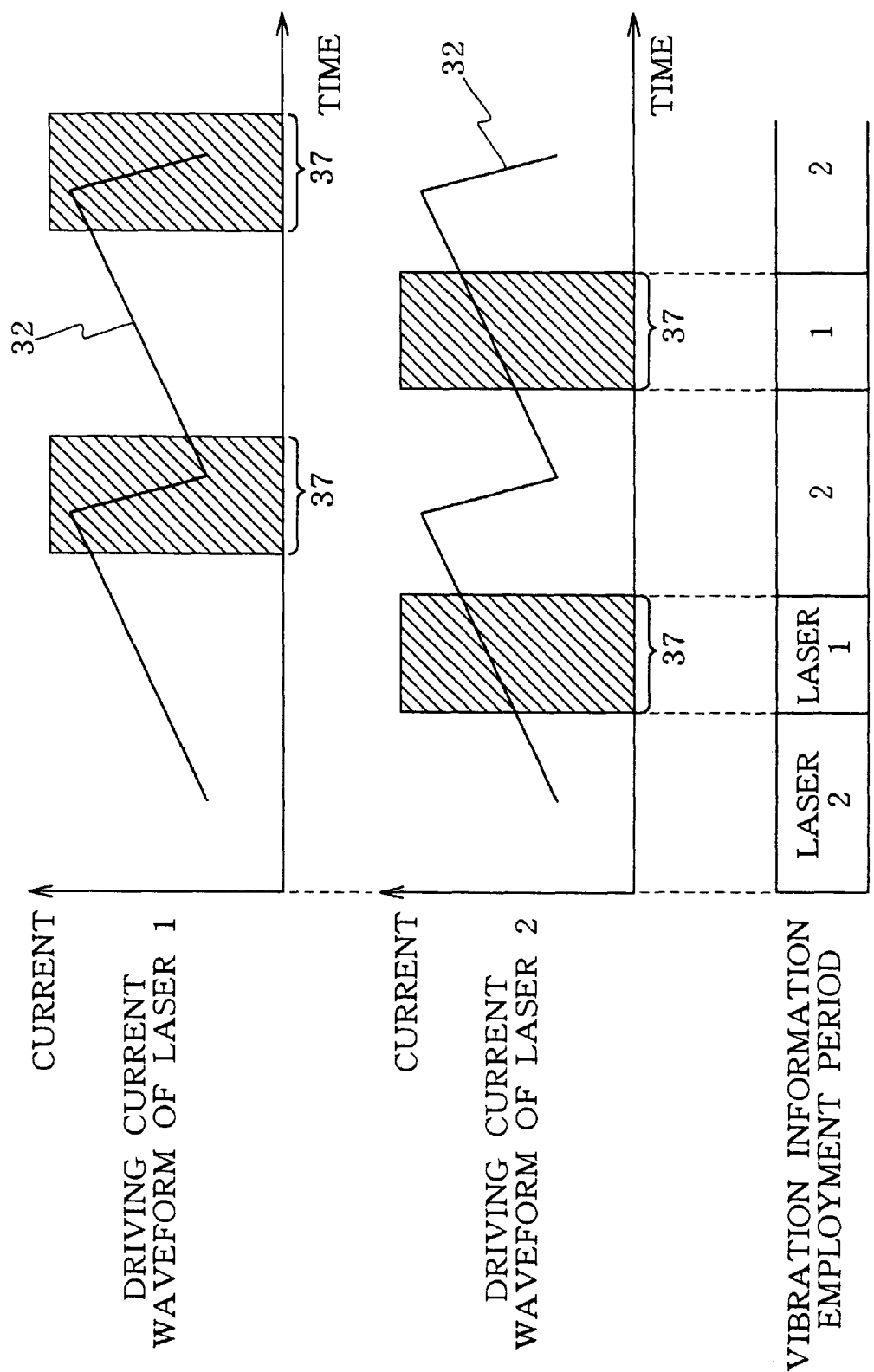
FIG. 19 is a waveform diagram showing a phase relationship between two laser driving currents according to the fourth embodiment.

FIG. 19 is a waveform diagram showing a phase relationship between the two laser driving currents according to the fourth embodiment. In a portion of the laser driving current waveform where its inclination changes, that is, at a peak of the driving current waveform, the current does not vary, so that no beat wave resulting from driving current modulation occurs. Further, when a triangular or sawtooth waveform is to be actually generated, since it is difficult to instantaneously change the inclination of the waveform at the peak of the waveform, the waveform loses its linearity before and after the peak and becomes similar to a curve. Thus, near the peak of the driving current waveform, the modulated beat frequency fb may not occur or may unstable if any. Accordingly, as shown in FIG. 19, when measurements are carried out with the phases of the laser driving currents deviating from each other, the instant periods 37 of the modulated beat frequency fb do not overlap between the resonators. Therefore, continuous vibration measurements can be stably carried out using the beat waves in modulated-beat-frequency stable periods of both resonators.

Figure 20:
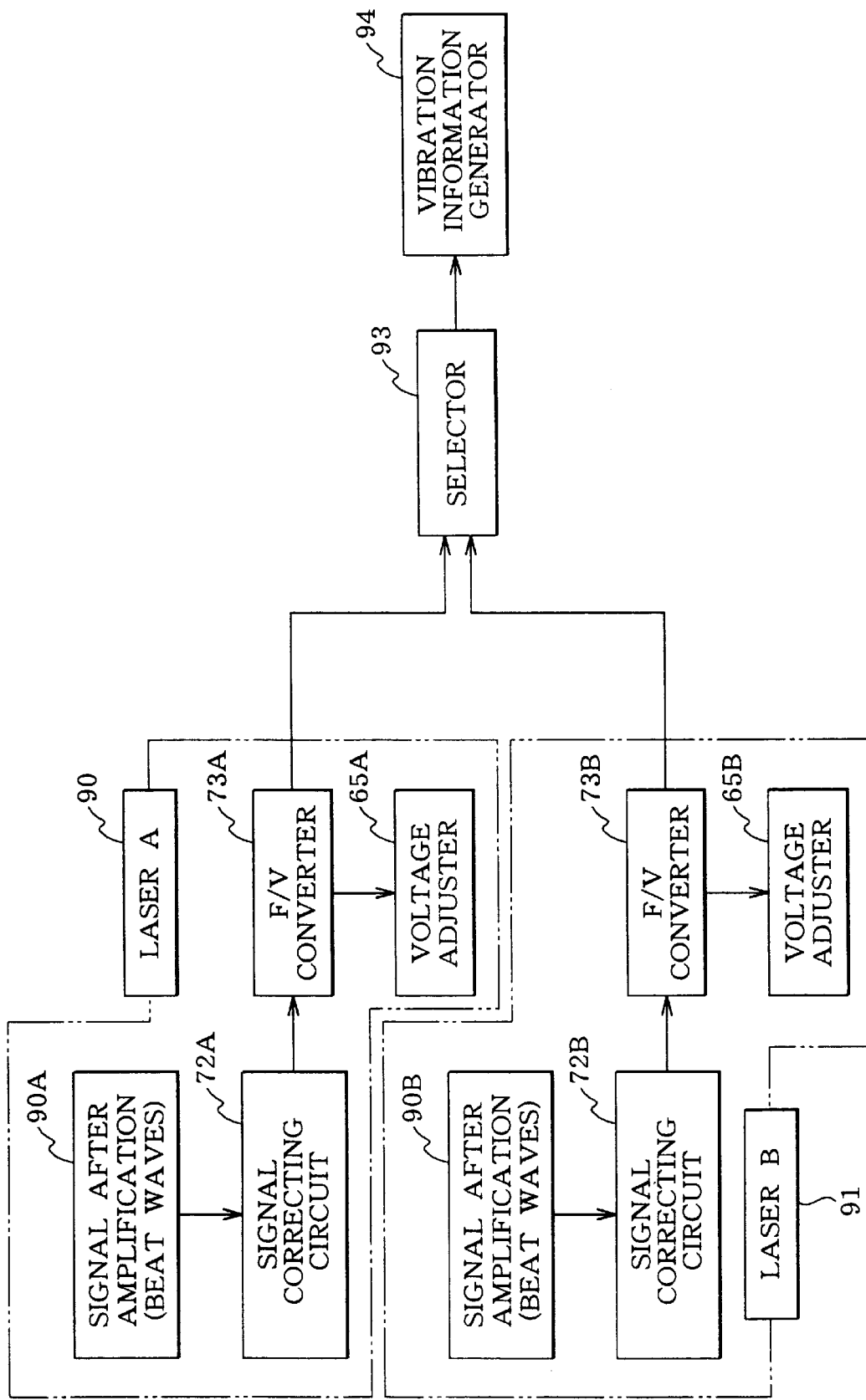
FIG. 20 is a block diagram showing an example the configuration of the fourth embodiment in detail.

FIG. 20 is a block diagram showing an example of the configuration of the fourth embodiment in detail. In the example shown in FIG. 20, a first laser A shown at reference 90 and a second laser B shown at reference 91 each execute the F/V conversion, and a selector 93 selects between the lasers A and B to remove the inconstant periods 37 of the beat waves. Specifically, the laser A comprises a signal correcting circuit 72A for removing noise from the beat waves, an F/V converter 73A for converting variations in the period of the beat waves free from the noise into variations in voltage, and a voltage adjusting circuit 65A for standardizing a voltage value for a speed variation waveform output from the F/V converter 73A. The laser B has a similar configuration, and the voltage adjusting circuits 65A and 65B modifies the amplitudes of the two speed variation waveform into the same shape.

FIFTH EMBODIMENT

Inconstant Period

Figure 21:
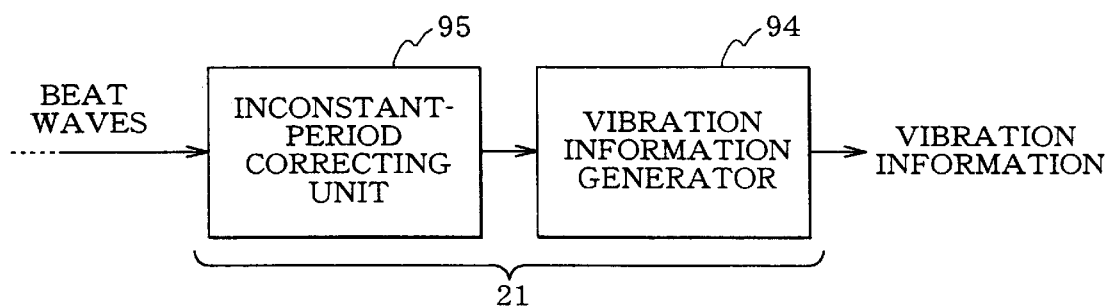
FIG. 21 is a block diagram showing an example the configuration of a fifth embodiment of the present invention.

In a fifth embodiment, a single laser is used to remove the inconstant periods from the waveform to intermittently measure vibration. This is useful in monitoring the maximum speed of vibration. FIG. 21 is a block diagram showing an example of a configuration according to the fifth embodiment of the present invention. In the example shown in FIG. 21, the signal processor 21 comprises an inconstant-period correcting means 95 for removing inconstant beat waves from the inconstant periods when the modulated beat frequency is inconstant in conjunction with the phase and period of the laser driving current, and the vibration information generator 94 for generating vibration information on the measured object based on the beat waves corrected by the inconstant-period correcting unit 95. The inconstant-period correcting unit 95 corrects the beat waves corresponding to the inconstant periods, which depend on the period and phase of the laser driving current waveform. For example, a value for the beat waves may be set at zero or the beat waves may be substituted with a waveform of a sufficiently small period. When the value for the beat waves is set at zero, the variations in beat waves can be removed from the inconstant periods without changing the configuration of the vibration information generator 94.

Figure 22A:
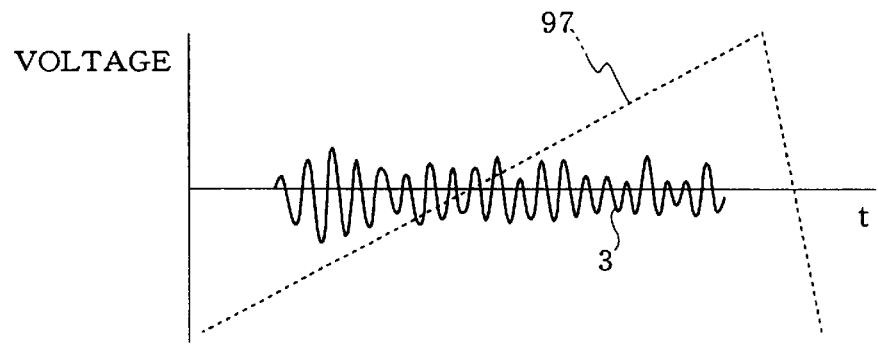
FIG. 22(A) is a diagram showing beat waves in a case where the measured object remains stationary.
Figure 22B:
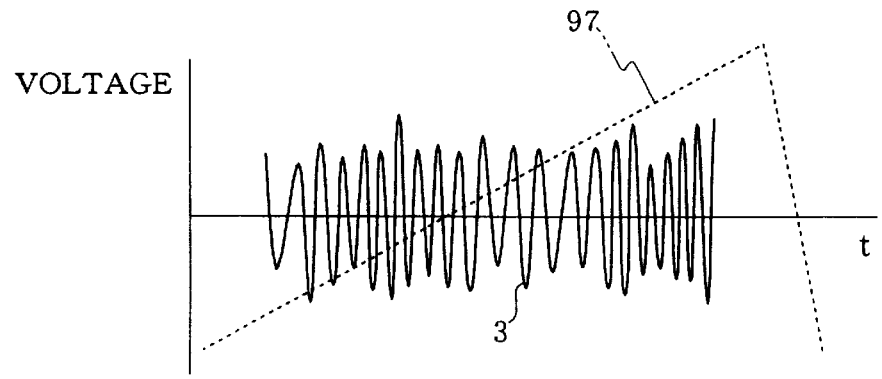
FIG. 22(B) is a diagram showing an example of beat waves in a case where the measured object is vibrating.

FIG. 22 is a waveform diagram showing an example of beat waves in the stable period in a fifth embodiment. FIG. 22(A) is a diagram showing beat waves observed when the measured object is stationary, and FIG. 22(B) is a diagram showing an example of beat waves observed when the measured object is vibrating. Allowing the beat waves shown in FIG. 22 to continue results in beat waves similar to those used in other embodiments such as the fourth embodiment. In the example shown in FIG. 22(A), the amplitude of the beat waves varies slightly, but the period is substantially constant; the frequency depending on this period is the modulated beat frequency fdb. In the example shown in FIG. 22(B), the modulated beat frequency is modulated by means of the Doppler frequency Δfd. The period starts with a large magnitude, then decreases, and subsequently increases. These variations in frequency correspond to Doppler frequency components of the measured object. This embodiment achieves a high modulated beat frequency of megahertz order even with inexpensive parts, thereby substantially improving the resolution of measurements of vibration displacement or speed of the measured object.

Since the present invention is configured and functions as described above, the modulated beat frequency generation controller provides the beat waves with the modulated beat frequency fb that is higher than the Doppler frequencyΔfd that is superposed on the returning beam while varying depending on the speed of the measured object, thereby enabling beat waves of the modulated beat frequency fb to be generated even when the measured object remains stationary. The Doppler frequency Δfd of the measured object is superposed on the beat waves as the sum of itself and the modulated beat frequency fb, so that with a constant modulated beat frequency, variations in the observed frequency of the beat waves (Doppler beat frequency fdb) represent variations in Doppler frequency Δfd. Consequently, a variation waveform of the Doppler beat frequency fdb obtained by observing the beat waves can be used as a speed variation waveform. Further, since the Doppler beat frequency Δdb can be measured depending on the number of beat waves, the resolution of vibration measurements can be improved by setting the modulated beat frequency fb high. In particular, the resolution can be substantially improved compared to the conventional calculation of the displacement and speed using half of the length of the oscillating frequency ($\lambda/2$) as a unit. As a result, vibration of a very small period or very small variations in displacement as cannot be conventionally measured stably can be accurately measured. On the other hand, if too many beat waves are generated relative to the vibration period of the measured object due to a large displacement compared to the magnitude of $\lambda/2$, the number of beat waves can be adjusted relative to the vibration period of the measured object by setting the modulated beat frequency low. Thus, with a variable modulated beat frequency fb, improvement of the measurement accuracy and reduction of the amount of data can be adjusted to a required extent. Furthermore, since beat waves are generated even when the measured object remains stationary, reversing of the moving direction or the speed can be measured based on variations in the observed frequency (Doppler beat frequency) of the beat waves even if the measured object undergoes complicated vibration having a plurality of vibration periods superposed thereon. In addition, since the beat waves maintains their appropriate waveform even when the measured object comes to a standstill, vibration attenuation can be appropriately measured. Therefore, a novel and excellent vibration measuring apparatus and method can be provided which can accurately measure the vibration conditions of the measured object without depending on the laser oscillating wavelength.

The invention may be embodied in other specific forms without departing from the spirit or essential characteristic thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 2000-69088 (Filed on Mar. 13, 2000) including specification, claims, drawings and summary are incorporated herein by reference in its entirety.

What is claimed is:

1. A vibration measuring apparatus, comprising a laser resonator for oscillating a laser beam and generating beat waves through self-mixture of a returning beam obtained when the emitted beam is reflected by the measured object with a oscillated beam when the returning beam is received, a modulated beat frequency generation controller for providing the beat waves with a modulated beat frequency that is higher than a Doppler frequency that is superposed on said returning beam while varying depending on a speed of said measured object, and a signal processor for executing signal processing on the beat waves generated by the self-mixture in said laser resonator and outputting a result of the processing as vibration information, wherein said signal processor comprises a vibration information generator for generating vibration information from the beat waves by defining variations in a frequency of said beat waves as variations in frequency from said modulated beat frequency by the amount of said Doppler frequency.

2. The vibration measuring apparatus according to claim 1, wherein said modulated beat frequency generation controller comprises a laser drive controller for controlling driving of said laser resonator using a laser driving current of a predetermined waveform and period.

3. The vibration Measuring apparatus according to claim 2, wherein said laser drive controller comprises a sawtooth wave generating function of generating a laser driving current having a period that depends on an optical path length to said measured object and on a maximum frequency of measured vibration and having a sawtooth waveform.

4. The vibration measuring apparatus according to claim 2, wherein said laser drive controller comprises a triangular-wave generating function of generating a laser driving current having a period that depends on an optical path length to said measured object and on a maximum frequency of measured vibration and having a triangular waveform.

5. The vibration measuring apparatus according to claim 3, comprising optical-path-length setting unit for setting said, optical path length at a predetermined value.

6. A vibration measuring apparatus, comprising a laser resonator for oscillating a laser beam and Causing self-mixture of a returning beam obtained when the oscillated emitted beam is reflected by the measured object with a beam oscillated and emitted when the returning beam is received, a laser drive controller for controlling driving of the laser resonator using a laser driving current of a predetermined waveform and period, and a signal processor for detecting beat waves having a modulated beat frequency corresponding to a difference in frequency between the emitted beam and the returning light which difference occurs in said resonator depending on variations in the oscillating frequency of said laser beam caused by temporal variations in said laser driving current and on emitted beam reciprocating time from emission of said emitted beam and reception of said returning beam, wherein said signal processor comprises a frequency variation form generator for generating, based on said beat waves, variations in Doppler frequency which depend on a speed of said measured object superposed on said modulated beat frequency, as a frequency variation waveform.

7. The vibration measuring apparatus according to claim 6, wherein said signal processor comprises a period-by-period signal processor for extracting, if said laser driving current has a triangular waveform, a Doppler frequency from each of rising and falling periods of the triangular wave.

8. The vibration measuring apparatus according to claim 6, wherein said signal processor comprises a driving current component removing unit for removing from said beat waves, light intensity components that depend on a waveform of said laser driving current.

9. The vibration measuring apparatus according to claim 6, wherein said frequency variation waveform generator comprises a differential function of differentiating said beat waves and a peak-to-peak period calculating function of calculating as said frequency variation waveform, variations in period when the beat waves differentiated by the differential function cross a zero line.

10. A vibration measuring apparatus, comprising a laser resonator, for oscillating a laser beam and causing self-mixture of a returning beam obtained when the oscillated emitted beam is reflected by the measured object with a beam oscillated and emitted when the returning beam is received, a laser drive controller for controlling driving of the laser resonator using a laser driving current of a predetermined waveform and period, and a signal processor for detecting beat waves having a modulated beat frequency corresponding to a difference in frequency between the emitted beam and the returning light which difference occurs in said resonator depending on variations in the oscillating frequency of said laser beam caused by temporal variations in said laser driving current and on emitted beam reciprocating time from emission of said emitted beam and reception of said returning beam, wherein said signal processor comprises a Fourier analysis function of determining a frequency spectrum of said beat waves, and a Doppler frequency calculating function of calculating a maximum or minimum value of a Doppler frequency that depends on the speed of said measured object, based on a spectrum width around said modulated beat frequency of the frequency spectrum generated by the. Fourier analysis function.

11. A vibration measuring apparatus, comprising a laser resonator for oscillating a laser beam and causing self-mixture of a returning beam obtained when the oscillated emitted beam is reflected by the measured object with a beam oscillated and emitted when the returning beam is received, a laser drive controller for controlling driving of the laser resonator using a laser driving current of a predetermined waveform and period, and a signal processor for detecting beat waves having a modulated beat frequency corresponding to a difference in frequency between the emitted beam and the returning light which difference occurs in said resonator depending on variations in the oscillating frequency of said laser beam caused by temporal variations in said laser driving current and on emitted beam reciprocating time from emission of said emitted beam and reception of said returning beam, wherein said signal processor comprises a Doppler frequency calculator for calculating a difference between a frequency of said beat waves and said modulated beat frequency, as a Doppler frequency that depends on a speed of said measured object, and a movement speed calculating the speed of said measured object based on the Doppler frequency calculated by the Doppler frequency calculator.

12. A vibration measuring apparatus, comprising a plurality of laser resonators for oscillating a laser beam and causing self-mixture of a returning beam obtained when the oscillated emitted beam is reflected by the measured object with a beam oscillated and emitted when the returning beam is received, a laser drive controller for controlling driving of each of the plural laser resonators using a corresponding laser driving current of a corresponding predetermined waveform and phase, and a signal processor for using as the modulated beat frequency a difference in frequency between the emitted beam and the returning beam which occurs in each of said plural resonators, to detect beat waves having a Doppler frequency superposed thereon, the Doppler frequency depending on a movement speed of said measured object, wherein said signal processor comprises a beat wave selector for selecting those of the beat waves occurring in each of said plural resonators which occur in one of the resonators which does not have an inconstant period when the modulated beat frequency is inconstant in conjunction with the phase and period of said laser driving current, and a vibration information generator for generating vibration information on said measured object based on the beat waves selected by the beat wave selecting section.

13. A vibration measuring apparatus, comprising a plurality of laser resonators for oscillating a laser beam and causing self-mixture of a returning beam obtained when the oscillated emitted beam is reflected by the measured object with a beam oscillated and emitted when the returning beam is received, a laser drive controller for controlling driving of each of the plural laser resonators using a corresponding laser driving current of a corresponding predetermined waveform and phase, and signal processor for using as the modulated beat frequency a difference in frequency between the emitted beam and the returning beam which occurs in each of said plural resonators, to detect beat waves having a Doppler frequency superposed thereon, the Doppler frequency depending on a movement speed of said measured object, wherein said signal processor comprises an inconstant-period correcting means for removing inconstant ones of said beat waves from inconstant periods when the modulated beat frequency is inconstant in conjunction with the phase and period of said laser driving current, and a vibration information generator for generating vibration information on said measured object based on the beat waves corrected by the inconstant-period correcting unit.

14. A vibration measuring method, comprising a laser beam emitting step of emitting a laser beam to a measured object using a laser resonator, a returning beam receiving step of returning part of a returning beam scattered and reflected by said measured object after being emitted at the laser beam emitting step and then traveling over a predetermined optical path length, and a beat wave detecting step of detecting beat waves having a Doppler beat frequency containing a modulated beat frequency corresponding to a difference in frequency between the returning light received at the returning beam receiving step and a beam emitted when the returning beam is received and containing a Doppler frequency that depends on a movement speed of said measured object, the method further comprising:

a vibration information generating step of generating, subsequently to the beat wave detecting step, vibration information on said measured object based on said modulated beat frequency and said Doppler beat frequency.

15. The vibration measuring apparatus according to claim 14, comprising a driving current waveform setting step of setting, before and after said laser beam emitting step, a waveform and a period of a driving current to said laser resonator depending on a predetermined target modulated beat frequency and said optical path length.

* * * * *

UNITED STATES PATENT AND TRADEMARK OFFICE
CERTIFICATE OF CORRECTION

PATENT NO.     : 6,470,753 B2
DATED          : October 29, 2002
INVENTOR(S)    : T. Maruyama It is certified that error appears in the above-identified patent and that said Letters Patent is hereby corrected as shown below:

Column 21,
Line 6, "Measuring" should be -- measuring --.
Line 20, after "said" delete ",".
Line 22, "Causing" should be -- causing --.

Column 22,
Line 17, after "the" delete ".".

Signed and Sealed this

Tenth Day of June, 2003

JAMES E. ROGAN
*Director of the United States Patent and Trademark Office*